United States Patent
Sheng et al.

(10) Patent No.: US 10,931,497 B2
(45) Date of Patent: Feb. 23, 2021

(54) SYNCHRONIZATION SIGNAL TRANSMISSION AND RECEPTION FOR RADIO SYSTEM

(71) Applicants: Sharp Kabushiki Kaisha, Sakai (JP); FG Innovation Company Limited, Hong Kong (CN)

(72) Inventors: Jia Sheng, Vancouver, WA (US); Tatsushi Aiba, Vancouver, WA (US); Toshizo Nogami, Chiba (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 15/970,519

(22) Filed: May 3, 2018

(65) Prior Publication Data
US 2018/0324022 A1 Nov. 8, 2018

Related U.S. Application Data

(60) Provisional application No. 62/501,716, filed on May 4, 2017.

(51) Int. Cl.
*H04L 27/26* (2006.01)
*H04L 5/00* (2006.01)
(Continued)

(52) U.S. Cl.
CPC ........ *H04L 27/2655* (2013.01); *H04L 1/1614* (2013.01); *H04L 5/0048* (2013.01); *H04L 5/0082* (2013.01); *H04L 5/0094* (2013.01); *H04L 27/2613* (2013.01); *H04L 27/2692* (2013.01); *H04W 36/0061* (2013.01);
(Continued)

(58) Field of Classification Search
CPC ............ H04L 27/2655; H04L 27/2613; H04L 27/2692; H04L 1/1614; H04L 5/0048; H04L 5/0023; H04L 5/0064; H04W 36/08
See application file for complete search history.

(56) References Cited

U.S. PATENT DOCUMENTS

2010/0080139 A1  4/2010  Palanki et al.
2012/0117135 A1* 5/2012  Yoon ............... H04J 13/102
                                          708/209

(Continued)

FOREIGN PATENT DOCUMENTS

WO   WO 2016/077701 A1   5/2016

OTHER PUBLICATIONS

R1-1704360, SS Periodicity, 3GPP, Apr. 7, 2017 (Year: 2017).*
(Continued)

*Primary Examiner* — Habte Mered
(74) *Attorney, Agent, or Firm* — ScienBiziP, P.C.

(57) ABSTRACT

A user equipment comprises receiving circuitry configured to receive bit map information indicating time domain positions, within a measurement window, of synchronization signal block(s) (SSB(s)) used for an intra and/or an inter-frequency measurement, the SSB(s) comprising at least a primary synchronization signal (PPS), a secondary synchronization signal (SSS), and a physical broadcast channel (PBCH), wherein the bitmap information comprises a bit string, and different lengths of the bit string are defined for different frequency bands.

4 Claims, 14 Drawing Sheets

(51) Int. Cl.
H04L 1/16 (2006.01)
H04W 36/00 (2009.01)
H04W 36/08 (2009.01)

(52) U.S. Cl.
CPC .......... H04L 5/0023 (2013.01); H04L 5/0064 (2013.01); H04W 36/08 (2013.01)

(56) References Cited

U.S. PATENT DOCUMENTS

| | | |
|---|---|---|
| 2013/0195069 A1 | 8/2013 | Frederiksen et al. |
| 2014/0086173 A1 | 3/2014 | Sadeghi et al. |
| 2016/0135156 A1 | 5/2016 | Lee et al. |
| 2016/0142981 A1 | 5/2016 | Yi et al. |
| 2018/0063736 A1* | 3/2018 | Sadeghi ................ H04W 24/10 |
| 2018/0167775 A1* | 6/2018 | Tian ...................... H04L 5/0048 |
| 2020/0067755 A1* | 2/2020 | Pan ....................... H04L 5/0048 |

OTHER PUBLICATIONS

International Search Report and Written Opinion dated Jul. 23, 2018 in PCT application PCT/US18/30915.
3GPP TSG RAN WG1 Meeting #88, "RAN1 Chairman's Notes", Athens, Greece, Feb. 13-17, 2017.
3GPP TSG RAN WG1 Meeting #88bis, "RAN1 Chairman's Notes", Spokane, USA, Apr. 3-7, 2017.
RP-161596, 3GPP TSG RAN Meeting #73, NTT Docomo, "Revision of SI: Study on New Radio Access Technology", New Orleans, Sep. 19-22, 2016.
Sesia et al, "LTE—the UMTS Long Term Evolution: From Theory to Practice", Second Edition, © 2011 John Wiley & Sons Ltd.
R1-1612721, 3GPP TSG RAN WG1 Meeting #87, NTT Docomo, Inc., "Discussion and Evaluation on NR-PSS/SSS design", Reno, USA, Nov. 14-18, 2016.
3GPP TSG RAN WG1 #87, RAN1 Chairman's Notes, Reno, USA, Nov. 14-18, 2016.
3GPP TSG RAN WG1 Meeting #85, RAN1 Chairman's Notes, Nanjing, China, May 23-27, 2016.
3GPP TSG RAN WG1 Meeting #86, RAN1 Chairman's Notes, Gothenburg, Sweden, Aug. 22-26, 2016.
3GPP TSG RAN WG1 Meeting #86bis, RAN1 Chairman's Notes, Lisbon, Portugal, Oct. 10-14, 2016.
R1-1610522, 3GPP TSG-RAN WG1 Meeting #86b, Intel Corporation, NTT Docomo, ZTE, ZTE Microelectronics, ETRI, InterDigital, "WF on the unified structure of DL sync signal", Lisbon, Portugal, Oct. 10-14, 2016.
R1-1611268, 3GPP TSG RAN WG1 #87, ZTE, ZTE Microelectronics, "Considerations on SS block design", Reno, USA, Nov. 14-18, 2016.
3GPP TS 36.211 V13.2.0, Technical Specification, $3^{rd}$ Generation Partnership Project; Technical Specification Group Radio Access Network; Evolved Universal Terrestrial Radio Access (E-UTRA); Physical Channels and Modulation (Release 13) (Jun. 2016).
3GPP TSG RAN WG1 Meeting NR Ad-Hoc, RAN1 Chairman's Notes, Spokane, USA, Jan. 16-20, 2017.
http://www.sharetechnote.com/html/Handbook_LTE_PBCH.html downloaded from internet May 2, 2108.
R1-1704358, :"Composition of SS block, burst and burst set", ZTE, ZTE Microelectronics, 3GPP TSG RAN WG1 Meeting #88bis, Spokane, USA Apr. 3-7, 2017, p. 1-10.
R1-1706830, "WF on Indication of actually transmitted SS blocks", ZTE, ZTE Microelecn:onics, InterDigital, 3GPP TSG RAN WG1 Meeting #88bis, Spokane, USA, Apr. 3-7, 2017, pp. 1-3.
R1-1704370, 3GPP TSG RAN WG1 Meeting #88bis, ZTE, ZTE Microelectronics, "DL Common Control for NR", Spokane, USA Apr. 3-8, 2017, p. 1-4.
R1-1704862, 3GPP TSG RAN WG1 Meeting #88bis, LG Electronics, "Discussion on SS burst set composition and time index indication", Spokane, USA, Apr. 3-7, 2017, pp. 1-8.
EP Supplementary Search Report dated Jul. 16, 2020 in EP Application 18794544.9.

* cited by examiner

SYNCHRONIZATION SIGNAL TRANSMISSION AND RECEPTION FOR RADIO SYSTEM

This application claims the priority and benefit of U.S. Provisional Patent Application 62/501,716, filed May 4, 2017, entitled "SYNCHRONIZATION SIGNAL TRANSMISSION FOR RADIO SYSTEM", which is incorporated herein by reference in its entirety.

TECHNICAL FIELD

The technology relates to wireless communications, and particularly to methods and apparatus for requesting, transmitting, and using synchronization signals in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

Work has started in the International Telecommunications Union (ITU) and 3GPP to develop requirements and specifications for new radio (NR) 5G systems, e.g., fifth generation systems. Within the scope of 3GPP, a new study item (SID) "Study on New Radio Access Technology" has been approved. The timeline and the study situations of NR development are summarized in RP-161596, "Revision of SI: Study on New Radio Access Technology", 3GPP TSG RAN Meeting #73, New Orleans, Sep. 19-22, 2016. In order to fulfill 5G requirements, changes with regard to 4G LTE system have been proposed for study, such as higher frequency spectrum usage (e.g., 6 GHz, 40 GHz or up to 100 GHz), scalable numerology (e.g., different subcarrier spacing (SCS), 3.75 KHz, 7.5 KHz, 15 KHz (current LTE), 30 KHz . . . possibly 480 KHz), beam based initial access (one traditional cell may contain multiple beams due to the particular beamforming adopted).

Pre-5G LTE systems can be treated as a single beam systems. Moreover, in such LTE systems, hierarchical synchronization signals, i.e., primary synchronization sequences (PSS) and secondary synchronization sequences (SSS) provide coarse time/frequency synchronization, physical layer cell ID (PCI) identification, subframe timing identification, frame structure type (FDD or TDD) differentiation and cyclic prefix (CP) overhead identification. Further, in the pre-5G LTE systems, a physical broadcast channel (PBCH) provides additional information, such as system frame number (SFN) and essential system information so that a wireless terminal (e., UE) can obtain information to access the network. An initial access procedure for a pre-5G LTE system is illustrated in FIG. 1.

In LTE system, three PSS sequences provide identification of cell ID (0-2); and SSS sequences provide identification of cell ID group (0-167). Therefore, in all 168*3=504 PCI IDs are supported in the LTE system. In a RAN1 #87 meeting, it was pointed out that "Number of IDs provided by NR-PSS/SSS" should be studied. See, e.g., 3GPP RAN1 #87 Chairman's Notes. Further, in RAN1 #86 meeting, it was agreed that "Detection of NR cell and its ID. See, e.g., 3GPP RAN1 #86 Chairman's Notes.

It is anticipated that in the next generation new radio (NR) technology, a cell corresponds to one or multiple transmission and reception point (TRPs). This means multiple TRPs can share the same NR cell ID, or each transmission and reception point (TRP) may have its own identifier. Further, the transmission of one TRP can be in the form of single beam or multiple beams. Each of the beams may also possibly have its own identifier. FIG. 2 provides a simple example depiction of a relationship between cell, transmission and reception point (TRP), and beam.

It has been agreed in RAN1 #86bis meeting, see, e.g., 3GPP RAN1 #86bis Chairman's Notes, that:
  PSS, SSS and/or PBCH can be transmitted within a 'SS block'
    Multiplexing other signals are not precluded within a 'SS block'
  One or multiple 'SS block(s)' compose an 'SS burst'
  One or multiple 'SS burst(s)' compose a 'SS burst set'
    The Number of SS bursts within a SS burst set is finite.
  From RAN1 specification perspective, NR air interface defines at least one periodicity of SS burst set (Note: Interval of SS burst can be the same as interval of SS burst set in some cases, e.g., single beam operation)

FIG. 3 is an example NR SS block structure according to the RAN1 #86bis meeting. In FIG. 3, "synchronization signal bursts series" represents a "SS burst set". Additional detailed examples are illustrated in R1-1610522, "WF on the unified structure of DL sync signal", Intel Corporation, NTT DOCOMO, ZTE, ZTE Microelectronics, ETRI, InterDigital, Lisbon, Portugal, 10-14 Oct. 2016. According to R1-1611268, "Considerations on SS block design", ZTE, ZTE Microelectronics, Reno, USA, November 2016, 14-18, 2016, the structure of the SS block of FIG. 3 may be as shown in FIG. 4. FIG. 4 shows that a synchronization signal block may be structured as a time division multiplex synchronization signal block, or as a frequency division multiplex synchronization signal block, or as a hybrid. FIG. 4 further shows that a synchronization signal block may comprise, e.g., sync signals (such as primary synchronization signal (PSS) and a secondary synchronization signal (SSS)), and a physical broadcast channel (PBCH), or other non-sync/non-PBCH information, such as reference signals, for example.

According to 3GPP RAN1 #87 Chairman's Notes, it has been further agreed in reference that:
  At least for a multi-beams case, at least the time index of SS-block is indicated to the UE; and
  From the UE perspective, SS burst set transmission is periodic, and that at least for initial cell selection, the UE may assume a default periodicity of SS burst set transmission for a given carrier frequency.

In pre-5G LTE, PSS/SSS and PBCH have different periodicity due to different detection performance requirements and different methods to combat channel distortion. For example, PBCH has channel coding and repetition to combat channel distortion, while PSS/SSS does not. The multiplexing methods described in R1-1611268, "Considerations on SS block design", ZTE, ZTE Microelectronics, Reno, USA, November 2016, 14-18, 2016 and FIG. 4 cannot work directly, as it is possible that either PSS/SSS or PBCH is not included in that SS block.

As illustrated in FIG. 3, one or multiple SS block(s) compose an SS burst, and one or multiple SS burst(s) further compose an SS burst set. The maximum integer number "L" of SS-blocks within a SS burst set may be specified. It is possible that, in different frequency bands, L may have respective different values, e.g., for frequency range up to 3 GHz, L could be the value from the value set [1, 2, 4]; for frequency range from 3 GHz to 6 GHz, L could be the value from the value set [4, 8]; for frequency range from 6 GHz to 52.6 GHz, L could be [64].

Within a SS burst set, L may be referred to as corresponding to the number of "nominally" transmitted SS blocks. A "nominal" SS block is a SS block which may potentially be transmitted in the synchronization signaling (SS) block burst set by a node. The nominal SS block indicates the possible SS block time location, e.g., the position of the SS block in the time domain (FIG. 3 shows that the SS blocks are arranged in time domain positions). The number and positions of the nominal SS blocks in a SS burst set can be predefined. So a wireless terminal operating in different frequency bands should have the knowledge of such nominal SS blocks, e.g., such knowledge of nominal SS blocks. The wireless terminal may have knowledge of the nominal blocks by such information being stored in memory of the wireless terminal, either without network signaling, e.g., pre-configured at the wireless terminal, or configured by the network, e.g., by signaling from the network.

A node need not transmit all nominal synchronization signaling (SS) blocks, but instead may transmit only certain "actual" synchronization signaling (SS) blocks, e.g., the node may actually transmit only a subset of the nominal synchronization signaling (SS) blocks. In addition, the position(s) of actual transmitted SS-blocks may be provided to UE for many purposes, including but not limited to helping a CONNECTED mode UE to receive DL data/control in unused SS-blocks and potentially for helping an IDLE mode UE to receive DL data/control in unused SS-blocks.

What is needed, therefore, and examples object of the technology disclosed herein, are methods, apparatus, and techniques for one or more of ascertaining in advance a number of actual synchronization signal blocks transmitted by a node, and correlating beams of a node to received synchronization signal blocks.

SUMMARY

In some of its example aspects the technology disclosed herein overcomes inefficiencies in telecommunications operations by, e.g., providing to a wireless terminal advance knowledge for which of the L integer number of synchronization signal blocks of a synchronization signaling (SS) block burst set the node actually transmits synchronization signal blocks. Such foreknowledge of actual synchronization signal block positions expedites not only the processing of the synchronization signaling (SS) block burst set, but also the measurements that are intensively performed on a beam-by-beam basis. In another of its example aspects, the technology disclosed herein provides techniques for identifying the synchronization signal block indices and/or beam indices of an access node, whereby the wireless terminal can correlate energy measurements on references signals to the actual beams to which the measurements relate, and thereby provide improved assessment of signal strength for making determinations of cell selection, cell re-selection, and/or handover and the like.

An example aspect of the technology disclosed herein concerns a user equipment and method of operating same. The user equipment comprises receiving circuitry configured to receive bit map information indicating time domain positions, within a measurement window, of synchronization signal block(s) (SSB(s)) used for an intra and/or an inter-frequency measurement, the SSB(s) comprising at least a primary synchronization signal (PPS), a secondary synchronization signal (SSS), and a physical broadcast channel (PBCH), wherein the bitmap information comprises a bit string, and different lengths of the bit string are defined for different frequency bands.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
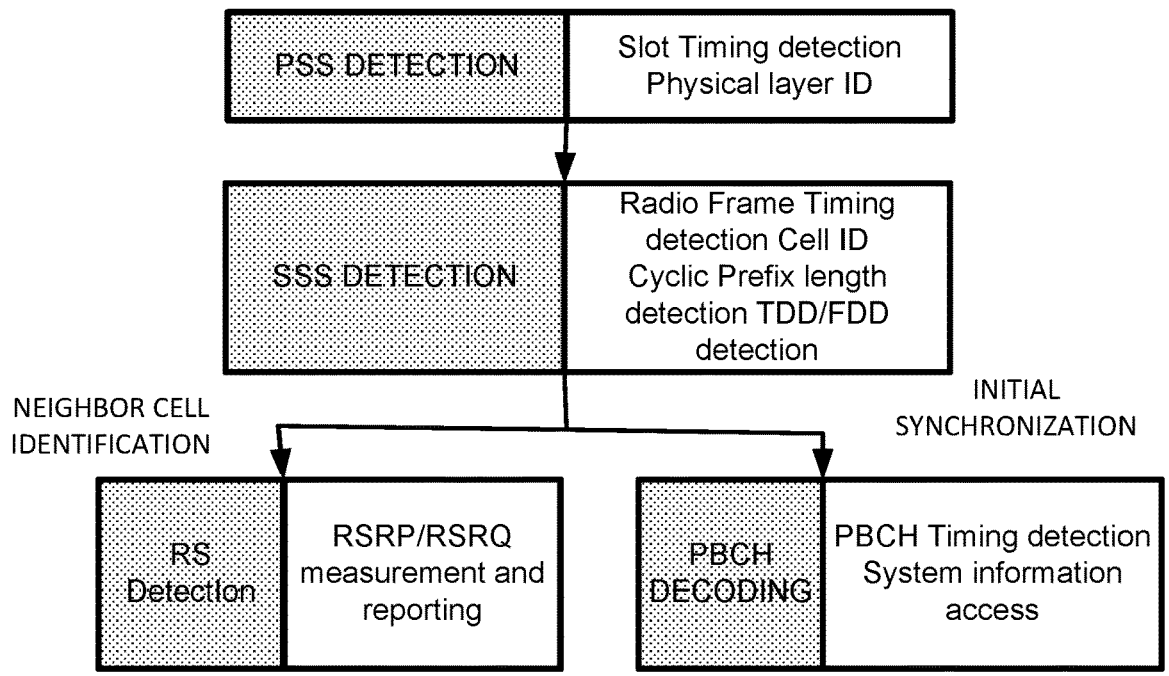
FIG. 1 is a diagrammatic view showing information utilized in an LTE initial access procedure.
Figure 2:
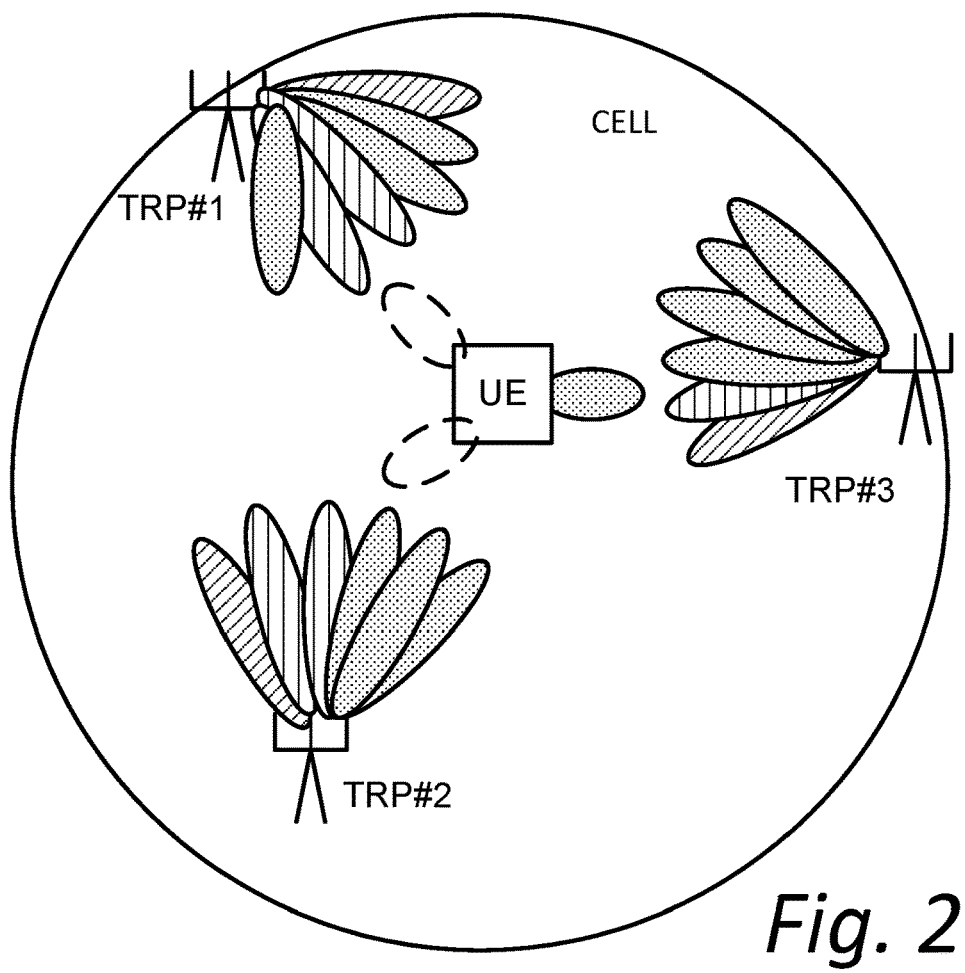
FIG. 2 is a diagrammatic view showing an example relationship between cell, transmission and reception point (TRP), and beam

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, tablets, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of an access node may include, in the 3GPP specification, a Node B ("NB"), an enhanced Node B ("eNB"), a home eNB ("HeNB"), or in the 5G terminology, a gNB or even a transmission and reception point (TRP), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, . . . ), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

FIG. 5A-FIG. 5E each show example respective communications systems 20A-20E wherein respective radio access nodes 22A-22E, collectively referred to as radio access node 22, communicate over air or radio interface 24 (e.g., Uu interface) with respective wireless terminals 26A-26E, collectively referred to as wireless terminal 26. As mentioned above, the radio access node 22 may be any suitable node for communicating with the wireless terminal 26, such as a base station node, or eNodeB ("eNB") or gNodeB or gNB, for example. As used herein, an "access node" or "node" should be understood to encompass all concepts relating to a node, such as (for example) to a cell served by the node. Constituent elements and functionalities of the example communications systems 20A-22E which are similar in the various example embodiment and modes are designated by same reference numerals. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s).

The respective transmitter circuits 36 and 46 may comprise, e.g., amplifier(s), modulation circuitry and other conventional transmission equipment. The transmitter circuitry 36 may comprise transmitters for plural beams, e.g., transmitter 34-1 for beam 0 though and including transmitter 34-(M-1) for beam M-1 (there being a total number of integer M potential beam transmitters in this particular non-limiting example). The respective receiver circuits 34 and 44 may comprise, e.g., e.g., amplifiers, demodulation circuitry, and other conventional receiver equipment.

In general operation node, access node 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, or symbol, slot, mini-slot in 5G for example).

To cater to the transmission of information between radio access node 22 and wireless terminal 26 over radio interface 24, the node processor 30 and terminal processor 40 of FIG. 1 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

Figure 3:
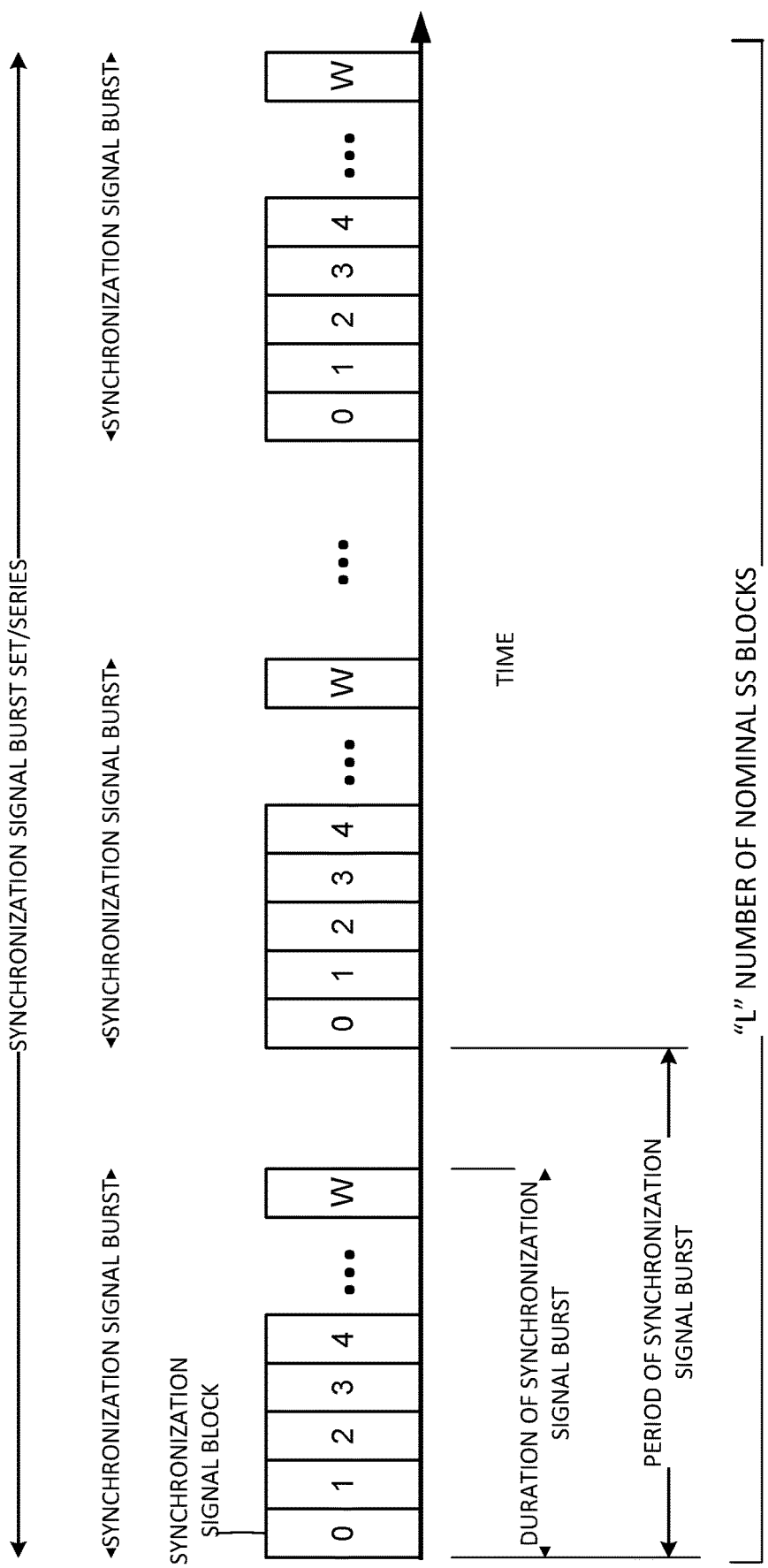
FIG. 3 is a diagrammatic view showing example NR SS block structure according to the RAN1 #86bis meeting.
Figure 5A:
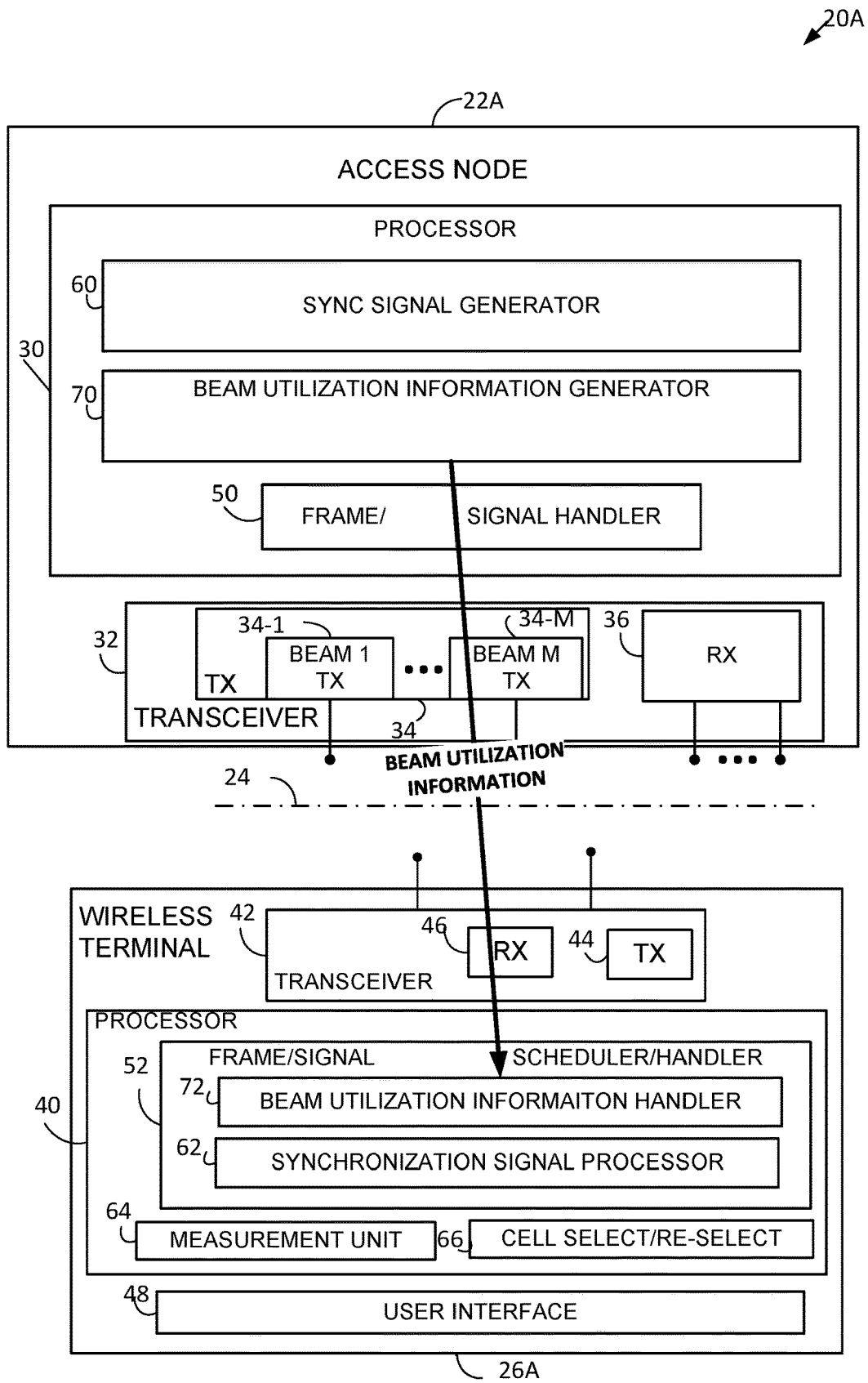
FIG. 5A-FIG. 5E are schematic views showing an example communications systems comprising differing configurations of radio access nodes and a wireless terminal, and wherein the radio access nodes provide beam utilization information.
Figure 6A:
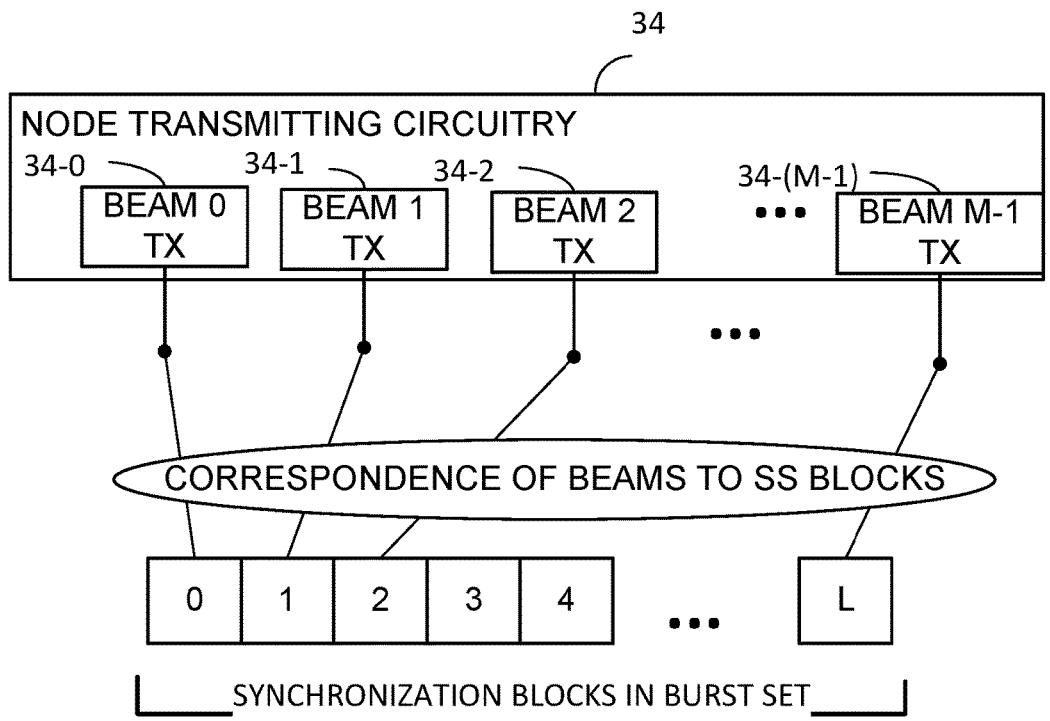
FIG. 6A is a diagrammatic view depicting a relationship between a maximum number of potential beams transmitted by a node of a radio access network and a nominal number of synchronization signaling (SS) blocks of a synchronization signaling (SS) block burst set.

The node processor 30 of radio access node 22 comprises synchronization signal generator 60. The synchronization signal generator 60 generates a synchronization signaling (SS) block burst set for radio access node 22, such as the synchronization signaling (SS) block burst set shown in FIG. 3. As mentioned above, node transmitter circuitry 34 of radio access node 22 comprises plural beam transmitters, such as an integer number L of beam transmitters 34-1 through 34-M for transmitting as many as M beams (beams 0-(M-1)) as shown in FIG. 5A. In the particular example embodiment and mode of FIG. 5A, a correspondence or relationship exists between the maximum number of beams M which may be transmitted by the radio access node 22A and the number N of nominal synchronization signal blocks that may be included in the synchronization signaling (SS) block burst set transmitted by radio access node 22A. Preferably but not necessarily always, such relationship or correspondence is M=L, meaning that each synchronization signal block in a synchronization signaling (SS) block burst set is associated with and (if actually transmitted) is transmitted by its corresponding beam, in the manner shown in FIG. 6A. Other relationships may also exist, such (for example) as two or more synchronization signal blocks of the synchronization signaling (SS) block burst set being associated with a given beam or one synchronization signal blocks of the synchronization signaling (SS) block burst set being associated with two or more than two beams.

Figure 6B:
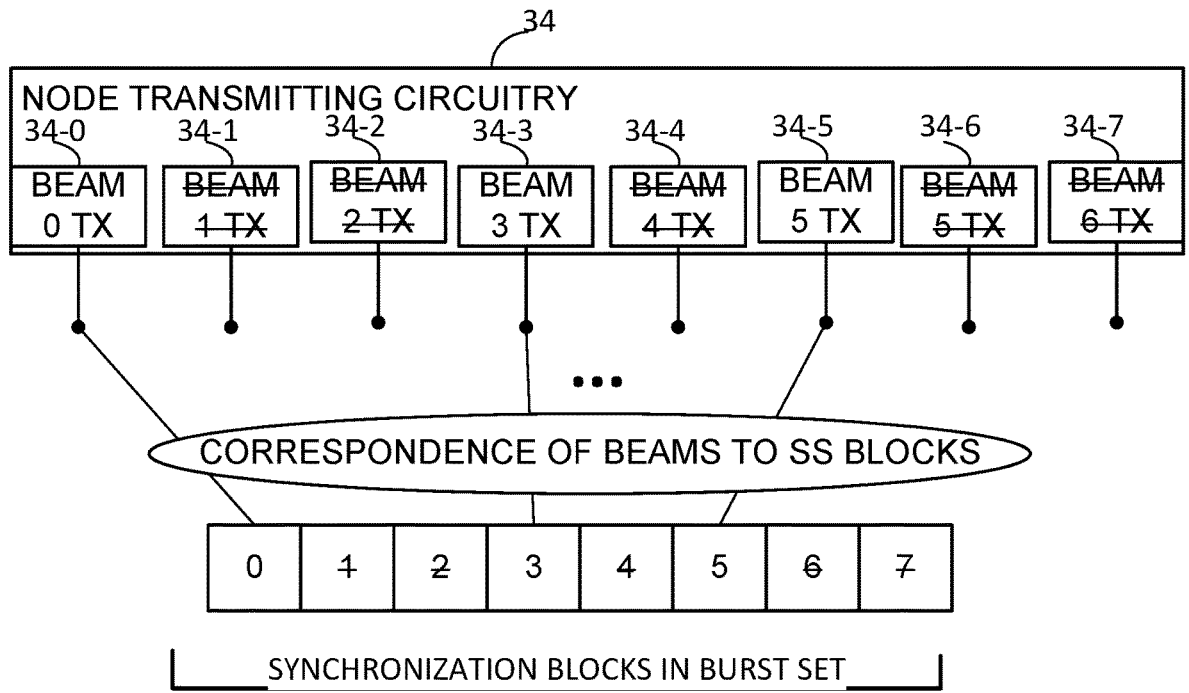
FIG. 6B is a diagrammatic view depicting an example relationship between beams of an access node and an actually used number of synchronization signaling (SS) blocks of a synchronization signaling (SS) block burst set.

As mentioned above, an access node need not necessarily transmit on each synchronization signaling (SS) block of a synchronization signaling (SS) block burst set. For example, an access node may, for any of various reasons, turn off one or more of its beam transmitters. FIG. 6B shows a non-limiting example situation in which an example radio access node comprises eight beam transmitters 34-0 through 34-7, and in which the synchronization signaling (SS) block burst set accordingly comprises eight nominal synchronization signaling (SS) blocks. In the particular time of the situation shown in FIG. 6B, however, only three of the beam transmitters are turned on or are actually transmitting, i.e., transmitters for beams 0, 3, and 5. Accordingly, for the time shown in FIG. 6B the radio access node actually transmits only three synchronization signaling (SS) blocks in the synchronization signaling (SS) block burst set of FIG. 6B, e.g., synchronization signal blocks 0, 3, and 5. For example, one or more synchronization signaling (SS) blocks may not be transmitted within the SS burst set. For example, a position(s) in which the SS block(s) may or may not be transmitted within the SS burst set may be referred to as a position(s) of the "nominal" SS block. Here, the position(s) of the "nominal" SS block may be defined by the specification and known information between the gNB and the wireless terminal. Also, the position(s) of the "nominal" SS block may be configured by using the PBCH, the PDSCH. i.e., the SIB, and/or the system information message, and/or the dedicated RRC signaling.

The wireless terminal 26A comprises synchronization signal processor 62 which handles the synchronization signaling (SS) block burst set after the set is received by terminal receiver circuitry 46. The synchronization signal processor 62 may comprise terminal frame/signal scheduler/handler terminal frame/signal handler 52, which in turn may comprise terminal processor 40. The synchronization signal processor 62 decodes the synchronization signaling (SS) blocks of the received synchronization signaling (SS) block burst set, and attempts to obtain from each an indication of the identity of the particular beam by which the synchronization signaling (SS) block was broadcast. For example, for the situation shown in FIG. 6B, the synchronization signal processor 62 will attempt to determine, from content of the respective synchronization signaling (SS) blocks or otherwise, the beams which transmitted synchronization signal blocks 0, 3, and 5. It should be kept in mind that the synchronization signal blocks may not be received in the exact order shown, so that it is preferable when possible to receive some signature or other identification for the beam that carried each received synchronization signal block.

The wireless terminal 26A needs to know an identification of each beam associated with each synchronization signal block in the synchronization signaling (SS) block burst set for reference signal measurement purposes, and ultimately for possible cell selection, cell re-selection, and/or handover based on such measurements. FIG. 5A shows that wireless terminal 26A comprises reference signal measurement unit 64 ("measurement unit 64"), which detects the energy received in the reference signals which, in some example implementations, may either themselves or equivalents thereof, be included in the synchronization signal blocks, as explained below. The measurements of reference signals are performed with respect to each beam, for which reason it is important that the synchronization signal blocks received in a synchronization signaling (SS) block burst set be distinguishable on a beam basis. The measurement unit 64 takes measurements for each beam over a measurement time window, and averages or otherwise quantifies such measurements for each beam over the measurement time window. The measurement unit 64 may, in a "filtering" operation, further quantify, score, or rate the transmission strength or quality of a certain node based on measurements taken from one or more beams of the node. For example, the measurement unit 64 may average results from plural beams of the node, e.g., all beams of the node, a predetermined number of beams of the node, a certain number of best beams of the node, etc. The measurement unit 64 is typically performing beam measurements with respect to several cells/nodes. Typically the wireless terminal 26A has been directed to monitor or measure not only strength of a serving node through which the wireless terminal 26A primarily communicates with the radio access network, but also several other "neighboring" nodes that may be of interest for possible handover should the strength of the serving node sufficient decline.

Reference signals are typically included in the synchronization signal blocks. For example, in addition to its synchronization function, the secondary synchronization signal (SSS) serves as a reference signal for measurements for an idle mode wireless terminal. For essentially all RRC modes the SSS serves, at least to some degree, as a reference signal, and being in the synchronization signal block means that the synchronization signal block includes a reference signal. It is also possible that a channel state information-reference signal (CSI-RI) may be included in the synchronization signal block and, if included, may serve as either alternative or additional reference signal symbols for measurement. Alternatively, the CSI-RI may be (1) included in the concept of a SS burst, e.g., a SS burst may be formed by an SS block with some additional signal and/or data and/or signaling, such as CSI-RS, PDSCH, PDCCH, or (2) included somewhere with some pre-defined relative positions from SS block, but not counted as neither part of an SS block, nor part of an SS burst, nor part of an SS burst set.

The measurements collected by measurement unit 64 are transmitted or reported to a cell selection/re-selection/handover functionality. Such functionality may either be at the wireless terminal itself as in the case shown in FIG. 5A, or at the radio access node 22A. Thus FIG. 5A further shows terminal processor 40 of wireless terminal 26A as comprising cell selection/re-selection/handover (HO) unit 66. The cell selection/re-selection/handover unit 66 serves to compare the filtered measurements of plural cells, and to generate a communication or request to the radio access network in the event that the cell selection/re-selection/handover unit 66 believes that a change in relative signal strength of competing nodes justifies a transfer or handover to a neighboring node.

In view of the many operations including detecting the synchronization signaling (SS) blocks and the measurements performed on a beam basis, it would be beneficial for a wireless terminal which receives a synchronization signaling (SS) block burst set to know in advance for which of the L integer number of synchronization signal blocks of a synchronization signaling (SS) block burst set the node actually transmits synchronization signal blocks. Namely, the wireless terminal may use the position(s) of the actual transmitted SS block(s), e.g., the time index of the actual transmitted SS block(s)) for detecting the SS block(s) within the SS burst set. Also, the wireless terminal may use the position(s) of the actual transmitted SS block(s) within the SS burst set for the measurement, e.g., the neighboring cell measurement. The maximum integer number "L" of SS-blocks within a SS burst set may be the number of the nominal SS block within the SS burst set. Such foreknowledge of actual synchronization signal block positions would expedite not only the processing of the synchronization signaling (SS) block burst set, but also the measurements that are intensively performed on a beam-by-beam basis. Accordingly, FIG. 5A shows the radio access node 22A, and node processor 30 in particular as comprising beam utilization information generator 70 which advantageously provides to the wireless terminal certain beam utilization information. FIG. 5A shows that beam utilization information generator 70 generates the beam utilization information (BUD, also known as first information, which is transmitted over the radio interface to wireless terminal 26A. The beam utilization information is received by terminal receiver circuitry 46, and processed by beam utilization information handler 72 of terminal frame/signal scheduler/handler 52, for use by synchronization signal processor 62 in decoding and efficiently processing the synchronization signaling (SS) block burst set received from the node.

Figure 7:
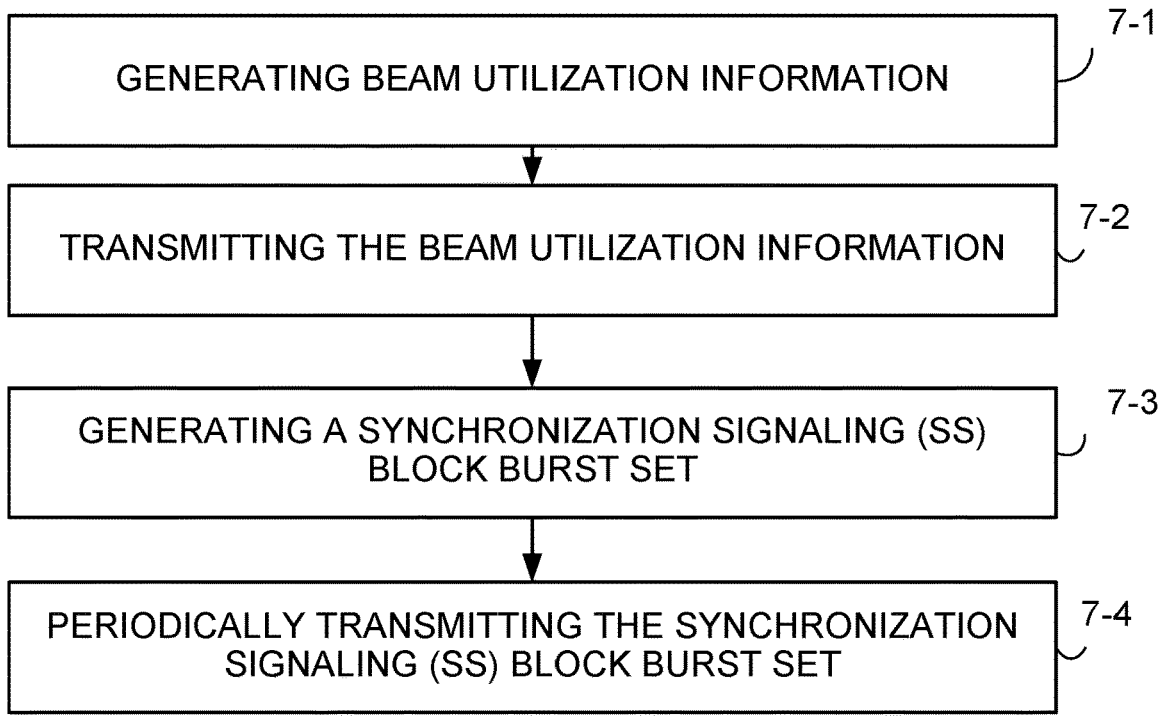
FIG. 7 is a flowchart showing example, non-limiting, representative acts or steps performed by the radio access node of the example embodiment and mode of FIG. 5A.

FIG. 7 shows example, representative basic acts or steps performed by radio access node 22A of FIG. 5A. Act 7-1 comprises the beam utilization information generator 70 generating beam utilization information. In an example embodiment and mode in which the beam utilization information is the actual number of beam transmitters, e.g., the actual number of synchronization signal blocks that are transmitted in a synchronization signaling (SS) block burst set, the radio access node 22A knows which of as many as L potential beam transmittters are actually turned on, and accordingly can set the beam utilization information as being such number of activated beam transmitters. In an example embodiment and mode in which the beam utilization information comprises beam identification information, as act 7-1 the beam utilization information generator 70 may prepare the synchronization signaling (SS) block burst set so that synchronization signal block indices or beam indices are included in the synchronization signal blocks of the synchronization signaling (SS) block burst set. Act 7-2 comprises the radio access node 22A transmitting the beam utilization information over a radio interface 24. Act 7-3 comprises the synchronization signal generator 60 generating a synchronization signaling (SS) block burst set to be transmitted by the node. Act 7B-4 comprises the radio access node 22A periodically transmitting the synchronization signaling (SS) block burst set over the radio interface. Should the content of the synchronization signaling (SS) block burst set change, act 7-3 is performed for each such change, followed by act 7-4. Act 7-1 is performed whenever the content of the beam utilization information changes, each such change being followed by performance of the other acts of FIG. 7.

Figure 8:
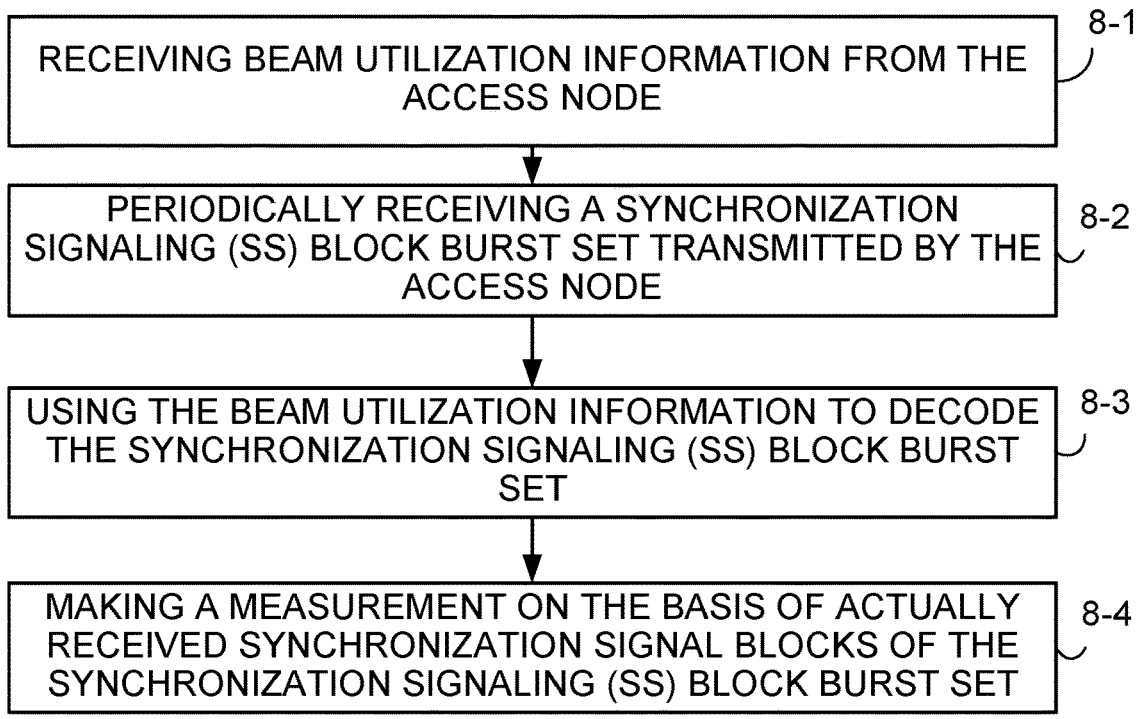
FIG. 8 is a flowchart showing example, non-limiting, representative acts or steps performed by the wireless terminal of the example embodiment and mode of FIG. 5A.

FIG. 8 shows example, representative basic acts or steps performed by wireless terminal 26A of FIG. 5A. Act 8-1 comprises the wireless terminal 26A receiving beam utilization information from the access node. Act 8-2 comprises the wireless terminal 26A periodically receiving a synchronization signaling (SS) block burst set transmitted by the node. Act 8-3 comprises using the beam utilization information to decode the synchronization signaling (SS) block burst set. Optional act 8-4 comprises the wireless terminal 26A making a measurement on the basis of actually received synchronization signal blocks of the synchronization signaling (SS) block burst set. After the measurements of act 8-4 are performed, measurement results may be reported to the radio access network in conjunction with a cell selection/re-selection operation.

In at least some of the example embodiment and modes, such as those discussed in section A below, the beam utilization information generated by beam utilization information generator 70 specifies for which of the L integer number of synchronization signal blocks of a synchronization signaling (SS) block burst set the node actually transmits synchronization signal blocks. Namely, the beam utilization information may be used for indicating that the number(s) of the nominal SS block(s), and/or the number(s) of the actual SS block(s), and/or the position(s) of the nominal transmitted SS block(s), and/or the position(s) of the actual transmitted SS block(s), within the SS burst set. Here, the number(s) and/or the position(s) of the actual transmitted SS block(s) may be identified within the number(s) and/or the position(s) of the nominal SS block(s). In other example embodiment and modes, such as those discussed and disclosed in section B below, the beam utilization information generated by beam utilization information generator 70 comprises beam identification information.

A. Conventions for Specifying Actual Beam Utilization

There are plural and differing conventions for expressing and transmitting the beam utilization information in situations in which the beam utilization information comprises an indication of which synchronization signal blocks, of the L integer number of nominal synchronization signal blocks of a synchronization signaling (SS) block burst set, are actually transmitted by the node. In these example embodiment and modes, the node processor 30 may generate the beam utilization information to be transmitted separately over the radio interface from the synchronization signaling (SS) block burst set, e.g., the beam utilization information may not be included in the synchronization signal blocks of the synchronization signaling (SS) block burst set. By providing an indication (e.g., the first information) of which of the synchronization signal blocks of the synchronization signaling (SS) block burst set are actually transmitted, the beam utilization information indicates actual content of the synchronization signaling (SS) block burst set. For example, the indication of which of the position(s) of the nominal SS block(s) is (are) used for actual SS block(s) transmission Thus, for a given carrier frequency, assuming the maximum number of SS block, e.g., the number of the position(s) of the nominal SS block(s), within a SS burst set is pre-defined, or pre-configured as L, the following designs or conventions may be utilized to inform wireless terminal of the positions of actually transmitted SS block(s). The beam utilization information description conventions described herein may be transmitted by the radio access node 22 to the wireless terminal 26 using any one or more or combinations of physical broadcast channel (PBCH), broadcast, or as system information, such as remaining minimum system information or any other system information messages.

A.1 Bitmap Convention

Figure 5B:
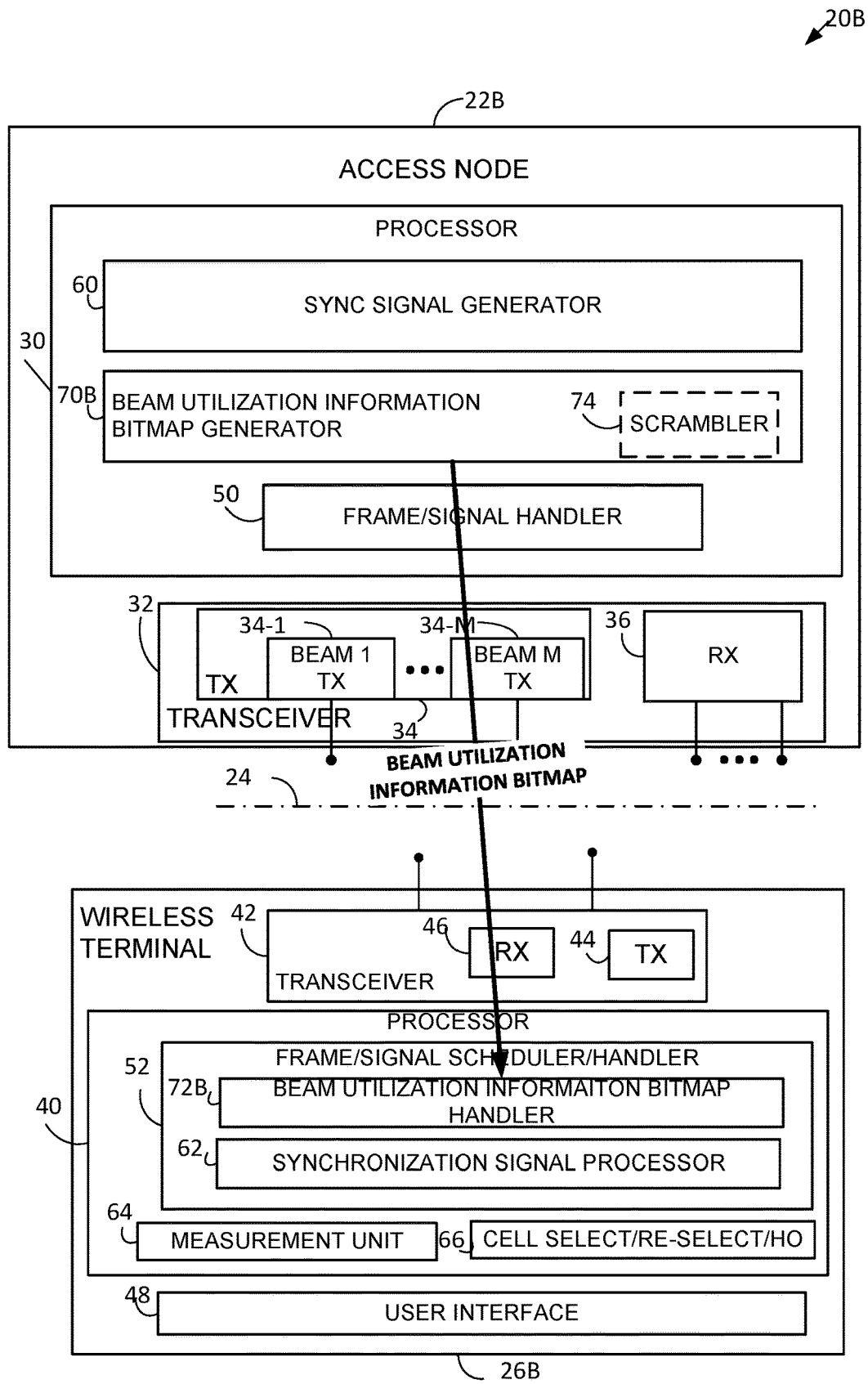

In an example embodiment and mode generically depicted by FIG. 5B, actual transmitted synchronization signaling (SS) block positions are informed to the wireless terminal as bitmap information. In this alternative design, L bits are needed to carry the information in the format of [$b_0$, $b_1$, ..., $b_{L-1}$)], where $b_n \in \{0,1\}$, $0 \le n \le L-1$. Counting may start from $b_1$ with $1 \le n \le L$. In the example embodiment and mode of FIG. 5B, the beam utilization information generator 70 takes the form of beam utilization information bitmap generator 70B, and the wireless terminal 26B is provided with beam utilization information bitmap handler 72B.

As an example, suppose, in a given frequency band, that maximally eight synchronization signaling (SS) blocks are allowed to be transmitted within a synchronization signaling (SS) block burst set. If all 8 SS blocks are used for synchronization and actually transmitted, then either [0,0,0,0,0,0,0,0] or [1,1,1,1,1,1,1,1] bitmap information is provided by wireless terminal 26B to the wireless terminal 26B. Either 0 or 1 may indicate the actual transmitted SS block. If this example is consistent with the situation shown in FIG. 6B, in which three synchronization signal blocks carrying synchronization information are to be actually transmitted (e.g., blocks 0, 3, and 5 which are respectively at the first, fourth and sixth SS block positions of the SS burst set), then either [1,1,0,1,0,1,1,0] or [0,0,1,0,1,0,0,1] bitmap information is provided by wireless terminal 26B to the wireless terminal 26B, depending on whether 0 or 1 indicates the actual transmitted SS block.

In the above example, the first and last SS block possible transmission positions within a SS burst set correspond to the leftmost and rightmost bits of the bitmap vector respectively. The order can of course be reversed, so as to make the first and last SS block possible transmission positions within a SS burst set correspond to the rightmost and leftmost bits of the bitmap vector respectively.

In the bitmap convention, the node processor 30 is configured to generate the beam utilization information as a bitmap which specifies for which of the L integer number of synchronization signal blocks of a synchronization signaling (SS) block burst set the node actually transmits synchronization signal blocks. The terminal processor 40 is configured to decode the beam utilization information as a bitmap which specifies for which of the L integer number of synchronization signal blocks of a synchronization signaling (SS) block burst set the node actually transmits synchronization signal blocks.

As described below, there are at least two differing ways to carry the beam utilization information bitmap.

A.1.1 Bitmap Convention: Direct Bitmap Transmission

The bitmap information for expressing the beam utilization information may be transmitted by information bits in a sequence or a channel directly. That is, the node processor circuit 30 and beam utilization information bitmap generator 70B in particular is configured to generate the beam utilization information as a bitmap as a sequence or channel of bits. Once the wireless terminal 26B successfully detects the related sequence, or the 26B may successfully decode the related channel, the wireless terminal 26B knows the beam utilization information directly. Signaling overhead associated with the direct bitmap transmission technique is directly related to the value of L.

A.1.2 Bitmap Convention: Bitmap Transmission by Scrambling

The bitmap information for expressing the beam utilization information may instead be used as scrambling sequence to encode other bits. The encoding of the bitmap could be in any scrambling way, e.g., bit XOR operation between bitmap sequence and other bits, of a sequence, or of a channel. As used herein, "other bits" could be information bits, or parity bits, e.g., CRC bits, or both, which are transmitted on any channel (e.g., PBCH, or channel used for dedicated signaling or channel used for system information). The length of the scrambling information should be the same length as the scrambling bitmap. Thus, for this technique the node processor circuit 30 and beam utilization information generator 70B in particular, as augmented by optional scrambler 74, is configured to generate the beam utilization information as downlink information which is scrambled or encoded by the bitmap. In this technique, no dedicated bit positions are needed for bitmap information; however, it is at the cost of complexity for blind decoding of bitmap information, through trying different candidate bitmap sequences to detect the right candidate.

A. 2 Index Convention

In another example embodiment and mode, the beam utilization information, in the form of actual transmitted SS block position information, is provided by the radio access node to the wireless terminal as an index. In accordance with some existing mapping relationship between the index and the actually transmitted positions pattern, the wireless terminal knows where the actual transmitted SS block positions are. The mapping relationship may be pre-defined, e.g., by an industry standard or specification, or pre-configured, e.g., by using broadcasted information, to the wireless terminal. For example, the mapping relationship may be stored in the memory of the wireless terminal, so that once the wireless terminal obtains the index information, the wireless terminal achieves the actual transmitted SS block positions with the known mapping relationship.

Figure 5C:
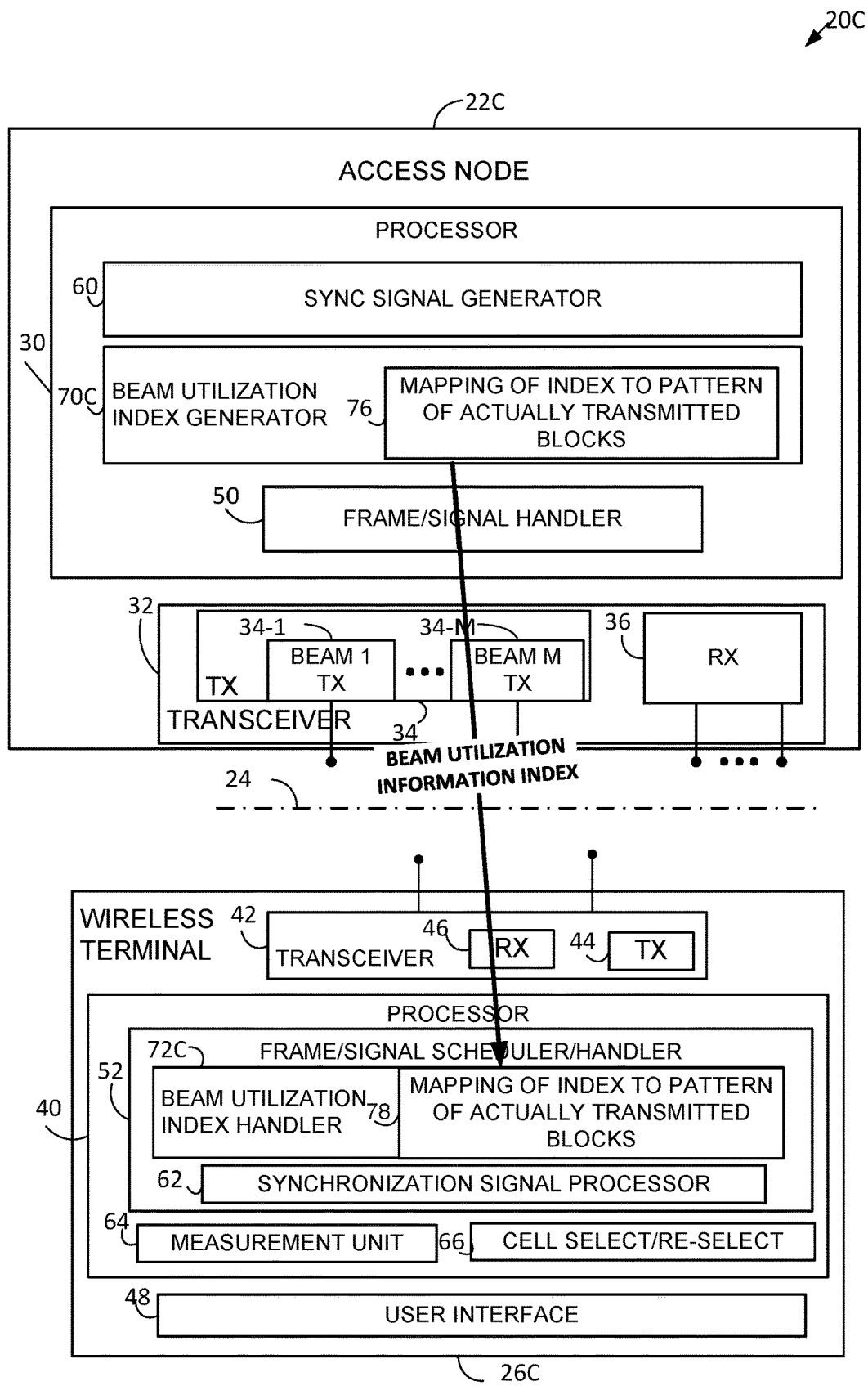

FIG. 5C shows generation of the beam utilization information according to the index convention, and particularly that node processor 30 comprises beam utilization index information generator 70C, which includes a memory unit 76 which stores a mapping of index values to respective patterns of blocks to be actually transmitted. Thus, processor circuit 30 of radio access node 22C and beam utilization information generator 70C in particular is configured to generate the beam utilization information as one index of plural possible index values, each of the plural possible index values corresponding to a unique one of plural patterns of actual synchronization signal block transmission. FIG. 5C further shows that terminal processor 40 of wireless terminal 26C, and terminal frame/signal scheduler/handler 52 in particular, comprises beam utilization index handler 72C, which has access to a comparable memory mapping 78 of index values to respective actually transmitted block patterns.

The mapping relationship can also be signaled by radio access node 22C to wireless terminal 26C through broadcast signaling, or dedicated RRC signaling. Such signaling may be either to provide the wireless terminal 26C with the mapping relationship, e.g., initial download, or to update the existing mapping relationship at the wireless terminal 26C. The terminal processor 40 of wireless terminal 26C is configured to decode the beam utilization information as one index of plural possible index values, each of the plural possible index values corresponding to a unique one of plural patterns of actual synchronization signal block transmission.

The index can be carried in any non-binary format, e.g., octal, or decimal, or hexadecimal. Therefore, it can only be carried by one bit in a channel, instead of being carried by a type of sequence. In other words, one index is transmitted in as a channel bit over the radio interface.

As an example of index transmission as a channel bit, consider an example in decimal format wherein, in a given frequency band, maximally four SS blocks are allowed to be transmitted within a SS burst set. If all four SS blocks are used for synchronization and actually transmitted, then either 0 or 15 (can also count as 1 or 16), is provided to the wireless terminal 26C, depending on whether the smallest value 0, or the largest value 1, indicates the case that all SS blocks with in SS burst set are actually transmitted. When the wireless terminal 26C obtains the information, e.g., 0 or 15, wireless terminal 26C knows it can be mapped to the transmitted pattern that all SS blocks are actually transmitted. If within the SS burst, in one practical case, two SS blocks carrying synchronization information are to be actually transmitted, which are at the first and third SS block positions of the SS burst set, then when the wireless terminal 26C obtains the index information (either 5, or 10, depending on whether the smallest value 0, or the largest value 1, indicates the case that all SS blocks with in SS burst set are actually transmitted), according to the mapping relationship shown in Table 1, the wireless terminal 26C knows which nominal SS block positions have actual SS block transmissions. Table 1 shows a mapping between actual SS block TX pattern index and actual SS block TX pattern.

TABLE 1

EXAMPLE INDEX TRANSMISSION MAPPING

| Index (e.g., decimal format) | Actual Transmitted Pattern |
| --- | --- |
| 0 | [0, 0, 0, 0] |
| 1 | [0, 0, 0, 1] |
| 2 | [0, 0, 1, 0] |
| 3 | [0, 0, 1, 1] |
| 4 | [0, 1, 0, 0] |
| 5 | [0, 1, 0, 1] |
| 6 | [0, 1, 1, 0] |
| 7 | [0, 1, 1, 1] |
| 8 | [1, 0, 0, 0] |
| 9 | [1, 0, 0, 1] |
| 10 | [1, 0, 1, 0] |
| 11 | [1, 0, 1, 1] |
| 12 | [1, 1, 0, 0] |
| 13 | [1, 1, 0, 1] |
| 14 | [1, 1, 1, 0] |
| 15 | [1, 1, 1, 1] |

In the above example of Table 1, the first and last SS block possible transmission positions within a SS burst set correspond to the leftmost and rightmost bits of the bitmap vector respectively. The order can of course be reversed, so as to make the first and last SS block nominal transmission positions within a SS burst set correspond to the rightmost and leftmost bits of the bitmap vector respectively.

The number of information bits in the index may be changed by the value of L, which is broadcasted. Moreover, an interpretation of a certain value of the index may be changed by the value L which is broadcasted. The actual transmitted pattern may be like a function of the index and L, e.g., assuming the pattern is T and the index is I, then T=f(I,L). Therefore, when I and L are determined, the pattern is determined. For example, in Table 1 L=4, so if L is updated to 2, then even in both the original and update cases, the wireless terminal receives the same I, e.g., 2. In the latter case, it might indicate the actual transmitted pattern [1,0], there could be a simple table for L=2: 0->[0,0], 1->[0,1], 2->[1,0], 3->[1,1].

A. 3 Convention Utilization Techniques

Multiple carrier frequency bands may be utilized in a radio access network, and indeed multiple carrier frequency bands may be utilized for transmission from a given access node. The beam utilization information description conventions described above (e.g., BITMAP CONVENTION: DIRECT BITMAP TRANSMISSION, BITMAP CONVENTION: BITMAP TRANSMISSION BY SCRAMBLING, and INDEX CONVENTION) may be employed either singularly or in combination in various multiple carrier frequency bands contexts. Non-limiting example convention employment techniques are described below:

A. 3.1 Uniform Convention Utilization Technique

Figure 9A:
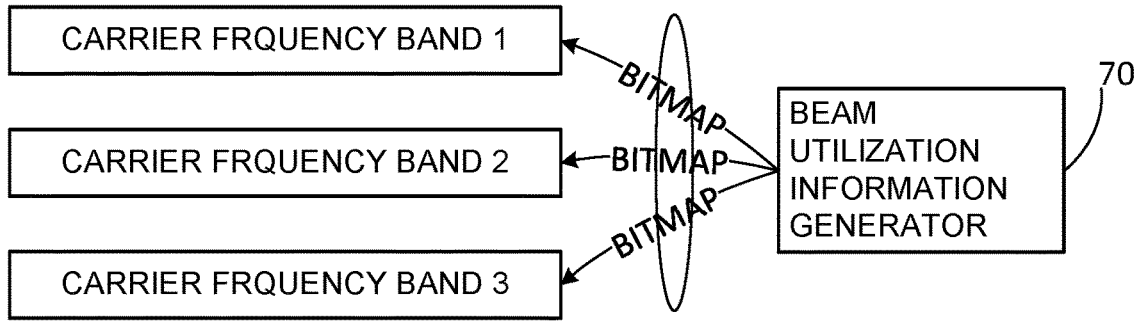
FIG. 9A-FIG. 9D are diagrammatic views depicting non-limiting example techniques for employing the beam utilization information description conventions in multiple carrier frequency band situations.

In an example embodiment and mode, the transmitter circuitry 34 is configured to transmit synchronization signaling (SS) block burst sets on plural carrier bands, and the node processor generates the beam utilization information according to a same beam utilization information description convention for each of the plural carrier bands. For example, FIG. 9A shows an example wherein beam utilization information generator 70 of radio access node 22 generates the beam utilization information for each of three carrier frequency bands according to a same beam utilization information description convention (e.g., bitmap). Alternatively, the beam utilization information generator 70 could have generated the beam utilization information for all three carrier frequency bands using another uniform beam utilization information description convention, such as the index convention. The receiver circuitry of the wireless terminal 26 is configured to receive synchronization signaling (SS) block burst sets on plural carrier bands. The terminal processor 40 is configured to decode the beam utilization information according to a same description convention for each of the plural carrier bands.

A. 3.2 Non-Uniform Convention Utilization Techniques

Figure 9B:
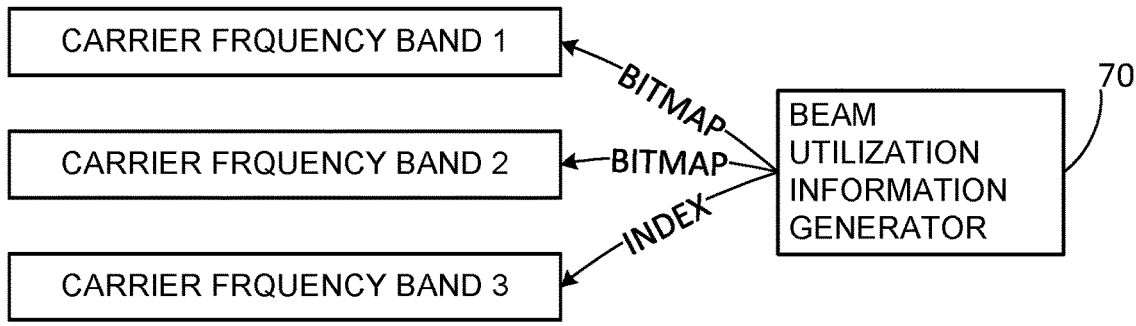

In another example embodiment and mode in which the transmitter circuitry 34 is configured to transmit synchronization signaling (SS) block burst sets on plural carrier bands, the node processor generates the beam utilization information differently for at least two differing carrier frequency bands. For example, FIG. 9B shows an example wherein beam utilization information generator 70 of radio access node 22 generates the beam utilization information for a first and second of three carrier frequency bands according to a bitmap description convention, but generates the beam utilization information for a third carrier frequency band according to another utilization information description convention (e.g., index). Thus, the beam utilization information generator 70 of FIG. 9B generates the beam utilization information according to a first convention [bitmap] for a first carrier band (e.g., carrier frequency band 1 or carrier frequency band 2) and generates the beam utilization information according to a second description convention [index] for a second carrier band (e.g., carrier frequency band 3). Thus, one alternative design is used per carrier frequency band; different carrier frequency bands use different alternative designs, e.g., the beam utilization information is configured differently for different frequency bands. The terminal processor 40 is configured to decode the beam utilization information according to a first convention for a first carrier band and to decode the beam utilization information according to a second description convention for a second carrier band. It was mentioned above that, in different frequency bands, the maximum integer number "L" of SS-blocks, may have respective different values. Examples were given, for example, of a frequency range up to 3 GHz wherein L could be the value from the value set [1, 2, 4], of a frequency range from 3 GHz to 6 GHz wherein L could be the value from the value set [4, 8]; and, a frequency range from 6 GHz to 52.6 GHz wherein L could be [64]. Thus, in a convention in which the beam utilization information is expressed in a bitmap convention, e.g., the bitmap information is expressed as a bit string, different lengths of the string may be defined for different frequency bands. In other words, the length of the bit string may depend on the particular frequency band.

Figure 9C:
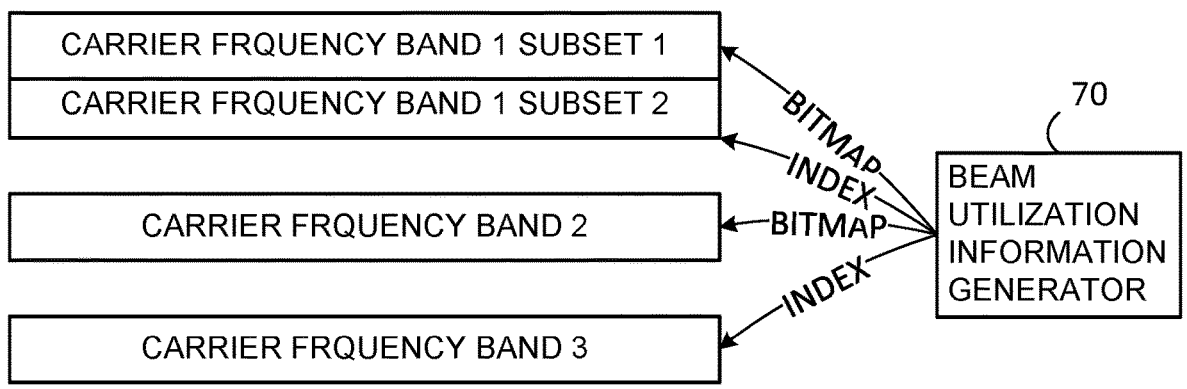

In other example embodiment and modes in which the transmitter circuitry 34 is configured to transmit synchronization signaling (SS) block burst sets on plural carrier bands, more than one alternative design can be used per carrier frequency band, and different carrier frequency bands use different alternative designs. As an example implementation, FIG. 9C shows beam utilization information generator 70 of radio access node 22 generating the beam utilization information according to different beam utilization information description conventions for a first subset of carrier frequency band 1 and for a second subset of carrier frequency band 1. That is, differing subsets of the same carrier frequency band are provided with beam utilization information according to differing beam utilization information description conventions. In the particular example of FIG. 9C, the first subset of carrier frequency band 1 receives the beam utilization information as a bitmap, while the second subset of carrier frequency band 1 receives the beam utilization information as an index. That is, the beam utilization information generator 70 is configured to generate the beam utilization information using a first description convention for a first subset of frequencies of the same carrier frequency band and using a second description convention for a second subset of frequencies of the same carrier frequency band. The terminal processor 40 is configured to decode the beam utilization information using a first description convention for a first subset of frequencies of the same carrier frequency band and using a second description convention for a second subset of frequencies of the same carrier frequency band.

Figure 9D:
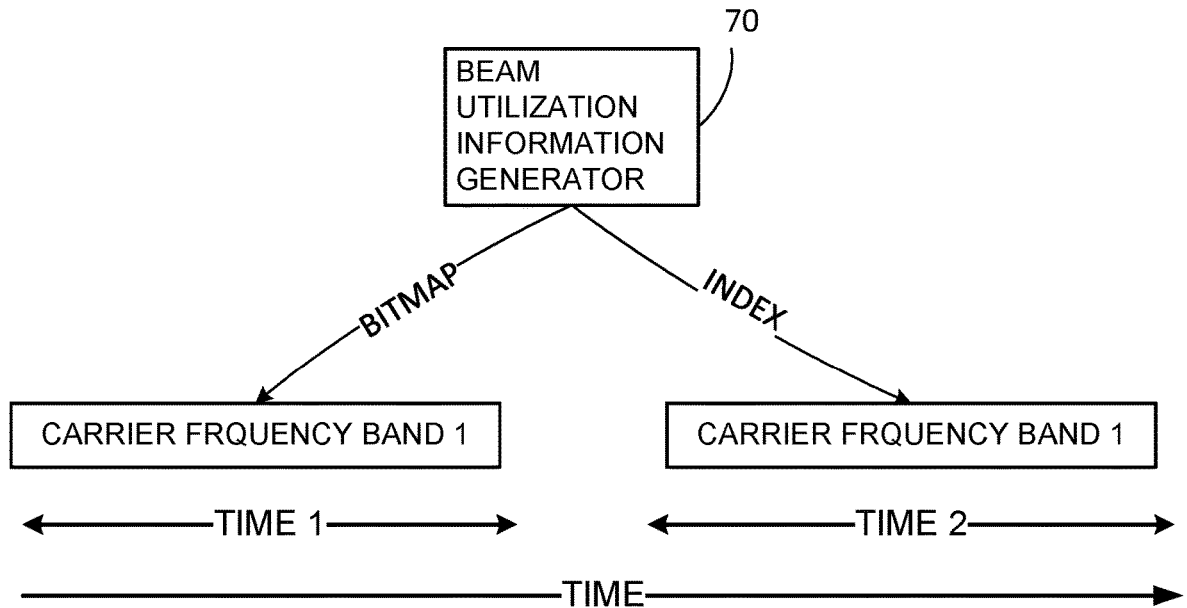

As another example implementation, FIG. 9D shows beam utilization information generator 70 of radio access node 22 generating the beam utilization information using a first description convention for a first time duration of the same carrier frequency band and using a second description convention for a second time duration of the same carrier frequency band. In particular, for time duration time 1 the beam utilization information generator 70 expresses the beam utilization information using the bitmap description convention for the carrier frequency band 1, but during a later time, e.g., time duration 2, the beam utilization information generator 70 expresses the beam utilization information using the index description convention for the carrier frequency band 1. The beam utilization information generator 70 may wish to use differing beam utilization information description conventions at differing times in view of various changed circumstances such as, for example, the radio access node using a different number of beams. Differing beam utilization information description conventions may have differing advantages during differing circumstances, making a change of beam utilization information description convention advantageous at certain times. The terminal processor 40 is configured to decode the beam utilization information using a first description convention for a first time duration of the same carrier frequency band and using a second description convention for a second time duration of the same carrier frequency band

B. Conventions for Identifying Utilized Beams

In the example embodiment and modes discussed above, the beam utilization information generated by beam utilization information generator 70 specifies for which of the L integer number of synchronization signal blocks of a synchronization signaling (SS) block burst set the node actually transmits synchronization signal blocks. In the example embodiment and modes discussed below, the beam utilization information generated by beam utilization information generator 70 comprises beam identification information. That is, node processor 30 generates the beam utilization information to indicate beam identification information for one or more plural beams associated with the synchronization signal blocks of a synchronization signaling (SS) block burst set.

As explained above, it is important that the wireless terminal 26 distinguish between the beams through which the synchronization signal blocks of the synchronization signaling (SS) block burst set are received. Distinction among the beams is necessary so that, e.g., the measurements made by the wireless terminal 26 on the received signals are properly correlated with the beams, and therefore so that a proper assessment can be made whether the wireless terminal 26 should continue to operate under the auspices of the serving node, or make handover to another node providing better signal quality.

Distinction among beams of a node was not an issue in pre-5G radio communications systems. In fact, for pre-5G LTE systems, after detection of synchronization signals, during initial access case, e.g., the case of an Idle mode wireless terminal's initial cell selection, when the wireless terminal is not camped on or connected to a cell, the wireless terminal decodes PBCH to obtain critical system information. On the other hand, during neighboring cell identification, e.g., the case of the cell reselection and/or the handover, and measurement cases, .g., of the neighboring cell, the wireless terminal does not need to decode PBCH, but instead the wireless terminal makes quality-level measurements based on reference signals, RSRP/RSRQ, of the neighboring cell, and then reports the measurements to the serving cell to trigger possible handover and or cell reselection procedures.

Figure 4:
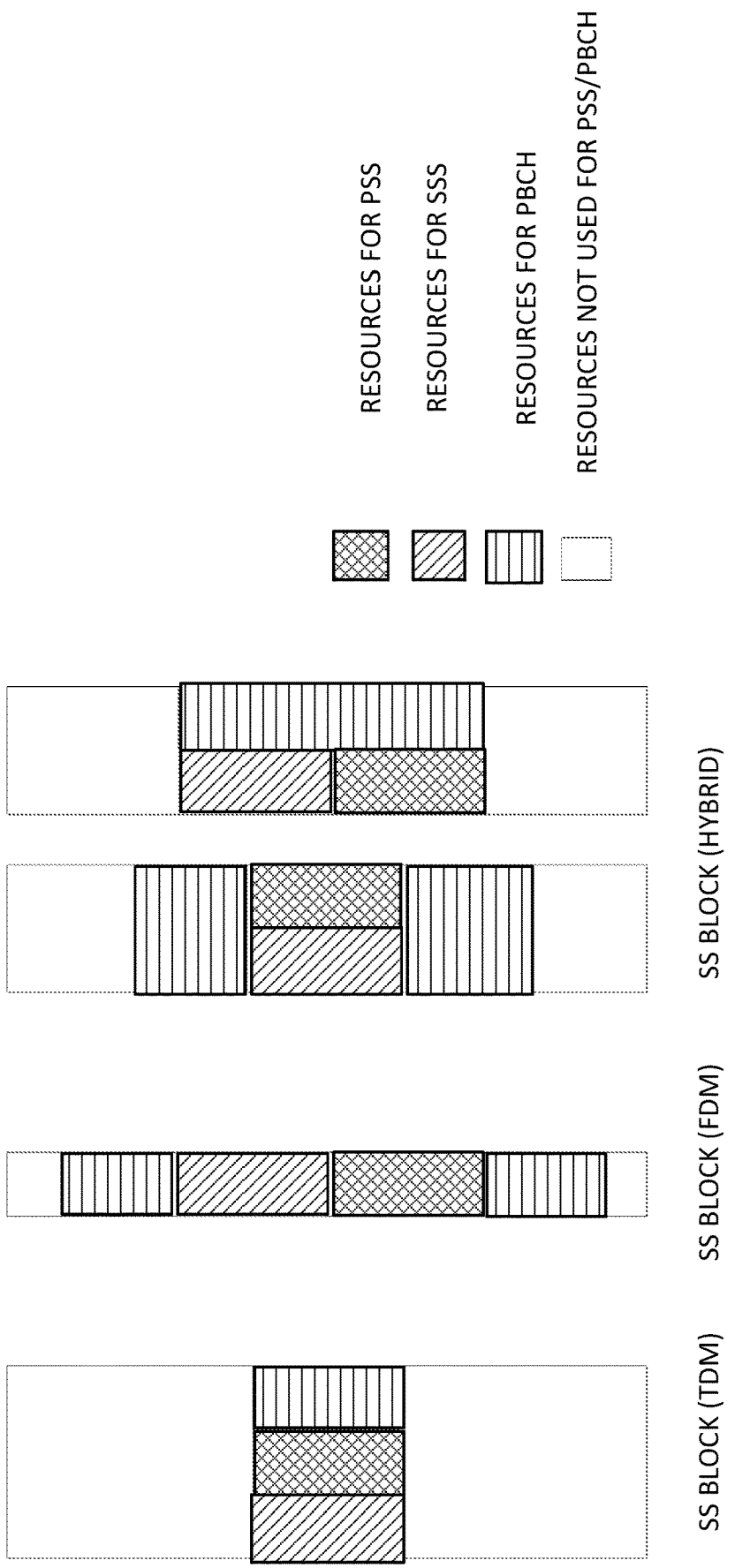
FIG. 4 is a diagrammatic view showing example structure of the SS block of FIG. 3.

In a new radio communications system, e.g., a post-4G radio communications system, the synchronization signal block includes symbols for NR-PSS and NR-SSS, as well as symbol(s) for PBCH in activated cells, and possible CSI-RS (channel state information-reference signal) symbols, as illustrated by way of example in FIG. 4. Further, if the requirements for mobility and handover can be met, the PBCH which is carried in the synchronization signal block could be used to the carry time index indication, thereby indicating the time position of the SS block within a SS burst or within a SS burst set. Here, the time index (e.g., the position, the time index indication) of the SS block(s) indicated by using PBCH may be based on the nominal SS block position. For example, the time index of the SS block(s) indicated by using PBCH may be counted on (e.g., identified by) the nominal SS block position. Also, the time index of the SS block(s) indicated by using PBCH may be based on the actual transmitted SS block position. For example, the time index of the SS block(s) indicated by using PBCH may be counted on (identified by) the actual transmitted SS block position. Since the SS block carries sync information of each beam, the time index indication can also be used to indicate the beam index, and thereby address the concern discussed above that the wireless terminal be able to identify the beam associated with the synchronization signal block for which signal strength is measured.

However, even for post-4G communications systems it is not yet decided (e.g., not yet standardized) whether the SS block from a deactivated cell must carry symbols for PBCH. Therefore, whether SS block must carry PBCH in each cell is still uncertain. Moreover, even if each SS block were to carry PBCH, and the PBCH were to include an index, presence of the PBCH is not necessarily checked in all circumstances and in all generations of networks. For example, as explained above for legacy LTE during handover or cell selection/reselection/handover, the wireless terminal 26 is historically not required to receive/decode system information from a neighboring cell when performing neighboring cell measurements. Therefore, even if the PBCH were to advantageously carry beam index indication, it may be difficult for the wireless terminal to obtain the index information.

During neighboring cell measurement, the wireless terminal has to measure some metric, e.g., signal strength or signal quality, of a reference signal for a neighbor node. In the new radio system, the wireless terminal may measure the signal strength or signal quality of a reference signal of each SS block for the purpose of handover or cell selection/reselection/handover, as generally described above. In a synchronization signal block, the reference signal (RS) could be either CSI-RS, or NR-XSS (e.g., NR-SSS), or both of them. Such measurement normally should not be a one-shot reference signal (RS) capture procedure, but instead there should be some measurement window with multiple-shot RS captures, so as to get a reliable measurement result. So at least in the new radio (e.g., post-4G) neighbor cell measurement process the wireless terminal has to be configured with the index information of each SS block, since (as explained previously) the reference signal is beam-based and the filtering should be beam-based. Otherwise (i.e., if the index information of each SS block is not configured), if beam-based (the multi-beam operation, the multiple SS blocks are detected within the SS burst set), when the wireless terminal captures (e.g., detects) one SS block and obtains reference signal from it, it has no idea which reference signals of other SS blocks already captured should be associated with this reference signal for filtering.

Thus, in view of uncertainty whether the new radio systems will require checking of PBCH (e.g., for index) in all applicable situations, and further in view of the need for backward compatibility with legacy LTE, the technology disclosed herein proposes various techniques for a radio access node to supply, and a wireless terminal to determine, the index of a beam carrying a synchronization signal block to be processed, e.g., for signal measurement.

Figure 5D:
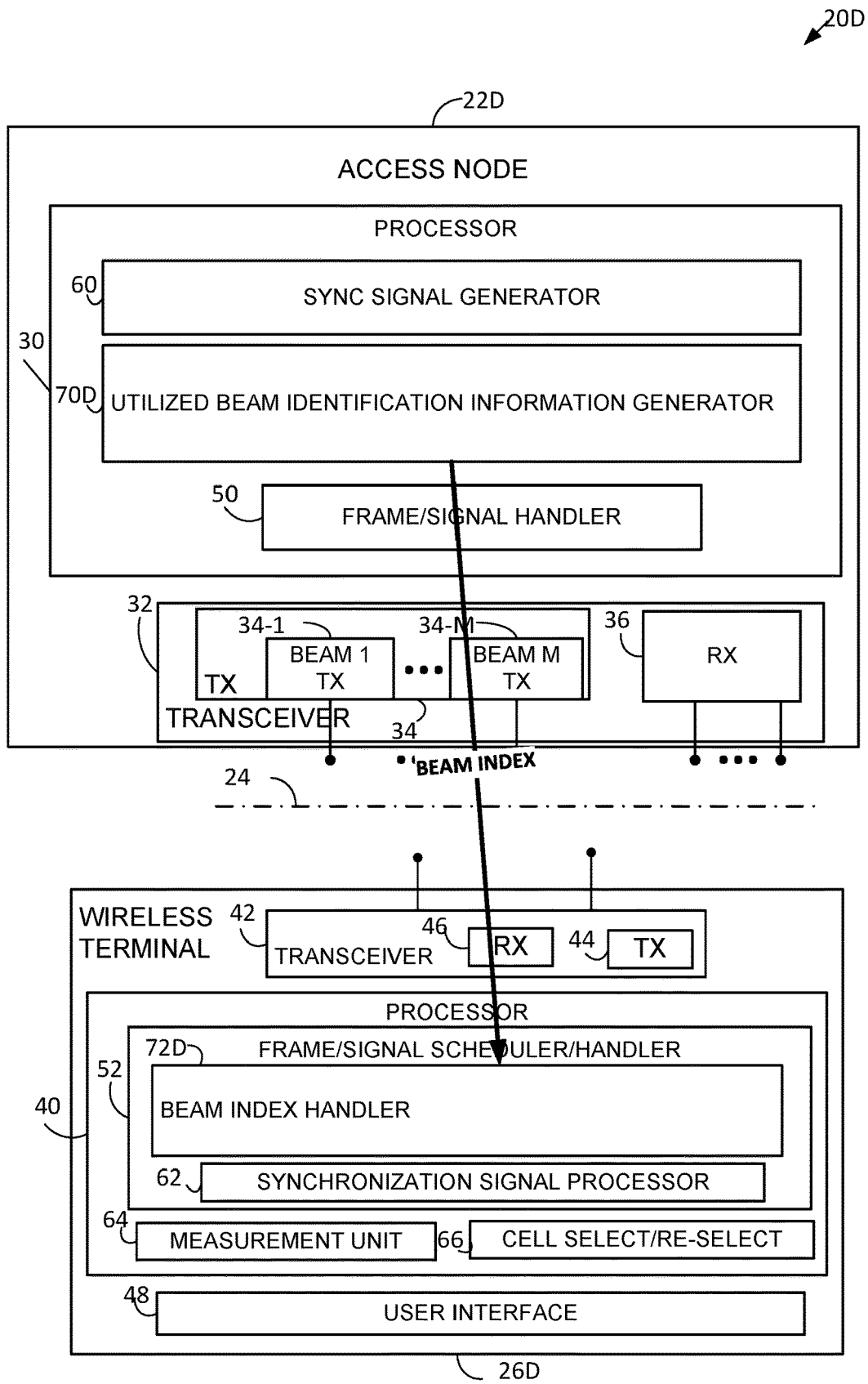

Therefore, for neighboring cell measurement, in order for the wireless terminal to know the SS block index/time index/beam index information and thereby perform measurement filtering, the technology disclosed herein provides the alternative designs depicted generically in FIG. 5D. FIG. 5D shows radio access node 22D as comprising utilized beam identification information generator 70D, and wireless terminal 26D as comprising beam index handler 72D. In some example embodiment and modes, the radio access node 22D generates the beam utilization information to determine for which of the plural beams the processor circuitry generates a synchronization signaling (SS) block, and the wireless terminal 26E decodes the beam utilization information to determine for which of the plural beams the processor circuitry generates a synchronization signaling (SS) block.

B.1 Identifying Utilized Beams: Decoding PBCH

In an example embodiment and mode, the radio access node 22D, and utilized beam identification information generator 70D in particular, is configured to generate the beam utilization information to comprise a synchronization signal block index carried in a physical broadcast channel of the synchronization signal blocks transmitted from the node. For neighboring cell measurement, after the detection of PSS/SSS, the wireless terminal 26 also always decodes PBCH, no matter whether SS block index information is explicitly or implicitly carried by PBCH or not, in order to attempt to obtain the SS block index associated with the PSS/SSS. Thereafter, the wireless terminal may start reference signal quality measurement. The radio access node 22D generates the beam utilization information as a synchronization signal block index carried in a physical broadcast channel of the synchronization signal blocks transmitted from the node, and the wireless terminal 26D decodes the beam utilization information as a synchronization signal block index carried in a physical broadcast channel of the synchronization signal blocks transmitted from the node.

B.2 Identifying Utilized Beams: Index Scrambling System Information

Figure 10:
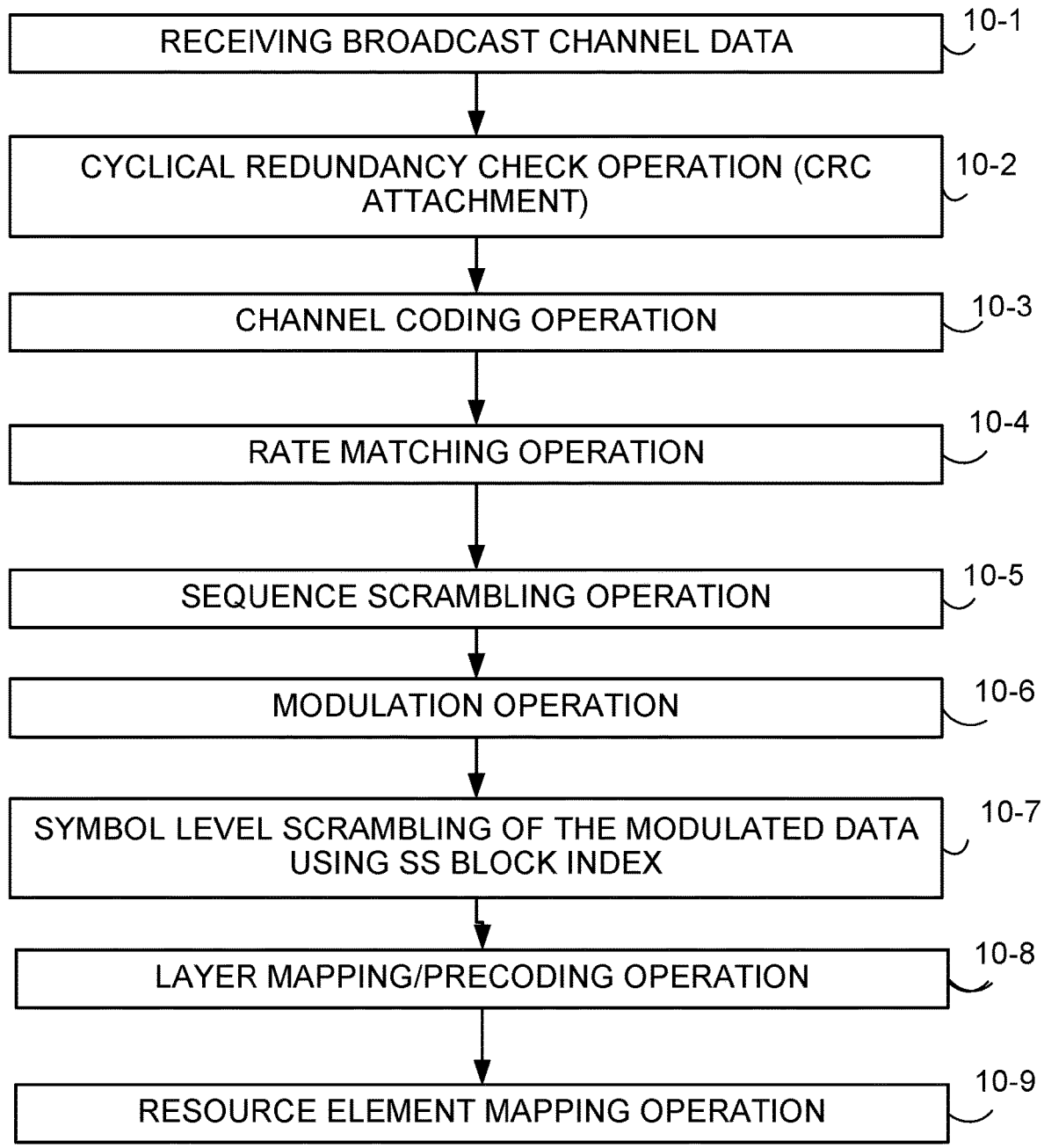
FIG. 10 is a flowchart showing basic, representative acts or steps performed by a radio access node according to an index scrambling example embodiment and mode.

In an example embodiment and mode, utilized beam identification information generator 70D is configured to symbol level scramble the system information transmitted using a SS block index corresponding to a particular beam. Example, representative, non-limiting acts or steps performed by radio access node 22D of FIG. 5D according to the index scrambling example embodiment and mode are shown in FIG. 10, showing both BCH transport channel processing and PBCH physical channel processing.

Act 10-1 comprises the radio access node 22D receiving broadcast channel information/data (e.g., $a_0, a_1, \ldots a_{A-1}$). Act 10-2 comprises performing a cyclical redundancy check operation (CRC attachment) on the received broadcast channel data (according, e.g., to 3GPP 36.212 sections 5.3.1/5.3.1.1) and generating CRC-attached data (e.g., $c_0, c_1, \ldots, c_{K-1}$). Act 10-3 comprises performing a channel coding operation on the CRC-attached data (according, e.g., to 3GPP 36.212 sections 5.3.1/5.3.1.2) and generating encoded data (e.g., $d_0^{(i)} d_1^{(i)}, \ldots d_{D-1}^{(i)}$). Act 10-4 comprises performing a rate matching operation (according, e.g., to 3GPP 36.212 sections 5.3.1/5.3.1.3) on the encoded data, obtaining rate-matched encoded data (e.g., $e_0, e_1, \ldots e_{E-1}$). Act 10-5 comprises performing a sequence scrambling operation (according, e.g., to 3GPP 36.212 section 6.6.1) on the rate-matched encoded data, to obtain scrambled data (e.g., $\tilde{b}_0^{(i)}, \tilde{b}_1^{(i)}, \ldots \tilde{b}_{tot-1}^{(i)}$). Act 10-6 comprises performing a modulation operation (according, e.g., to 3GPP 36.212 section 6.6.2) on the scrambled data, to obtain modulated data (e.g., $d_0, d_1, \ldots, d_{symb-1}$). Act 10-7 comprises performing symbol level scrambling of the modulated data (as described below) to obtain scrambled symbols. Act 10-8 comprises performing a layer mapping/precoding operation (according, e.g., to 3GPP 36.212 section 6.6.3) on the scrambled symbols to obtain layer mapped/precoded symbols. Act 10-9 comprises performing a resource element mapping operation (according, e.g., to 3GPP 36.212 section 6.6.4) on the layer mapped/precoded symbols to obtain a resource element.

In the alternative design that employs symbol level scrambling of the system information transmitted using a SS block index corresponding to a particular beam, other than for act 10-7 the radio access node 22D uses similar procedures as LTE. However, in act 10-7 after the modulation act 10-6, $\log_2 L$ symbols carried by PBCH are scrambled with the SS block index, where the symbols are at some pre-defined positions, e.g., the first $\log_2 L$ symbols, or the last $\log_2 L$ symbols, or some particular pattern of $\log_2 L$ symbols. For act 10-7 the scrambling procedures are modulated symbol based, therefore there is BPSK conversion on the original bit sequence indicating SS block index, e.g., 0->+1 and 1->-1; or 0->-1 and 1->+1. The scrambling of act 10-7 is performed by multiplying BPSK sequence indicating SS block index with corresponding positions' modulated symbols.

As an example, in a high frequency band, a large number of, e.g., 64 SS blocks, might be carried in one SS burst set. In such case, a 6-bit sequence indicating SS block index is used for scrambling.

During neighboring cell reference signal quality measurement, after detection of PSS/SSS, the wireless terminal 26D also detects the SS block index through blind detection of the scrambled sequence indicating SS block index. This detection is similar as PSS or SSS sequence detection, through coherent or non-coherent detection, e.g., for coherent detection, the highest energy detected is the right candidate sequence carrying SS block index. This alternative that employs symbol level scrambling of the system information transmitted using a SS block index works well when L has small value; when L is large, the blind detection complexity increases.

Thus, in an example embodiment and mode, the radio access node 22D generates the beam utilization information as symbol level scrambling of system information transmitted from the node by the particular beam, and the wireless terminal 26D decodes the beam utilization information as symbol level de-scrambling of system information transmitted from the node by the particular beam.

B.3 Identifying Utilized Beams: Inter-Node Signaling

As mentioned above, if the PBCH carries the SS block index, no matter implicitly or explicitly, the wireless terminal during initial access anyway has to decode PBCH, so there is no problem for the wireless terminal to obtain the SS block index information. A problem arises, however, during cell reselection, e.g., UE inactive mode and idle mode, and handover, e.g., UE connected mode. In an example embodiment and mode, the wireless terminal follows pre-5G LTE principles without decoding PBCH in neighboring cell measurements to obtain SS block index information, and instead obtains the beam utilization information of the neighbor cell from the wireless terminal's current serving cell, through broadcast signaling, or dedicated RRC signaling, or both.

In this example embodiment and mode, the wireless terminal obtains the actual SS block transmission position information, which is discussed in section A above, by signaling from its serving node. The information could be in the format of any one or any combinations designed in section A. Therefore, the neighboring cells which are configured for the wireless terminal for measurement should have such information exchanged between eNB/gNB, and finally signaled to the wireless terminal in the wireless terminal's serving cell. As intra-frequency neighboring cell measurements and inter-frequency neighboring cell measurements target at different types of cells, the serving cell uses different signaling to inform UE the information. Thus, to obtain the beam utilization information in the example embodiment and mode of FIG. 5E, the wireless terminal does not need to read the PBCH.

PBCH decoding is always needed in the serving cell, while in the situation of section B.1 hereof, PBCH decoding of neighboring cell is always mandatory. In some situations it may be necessary the decoding of broadcast signaling which carries actual transmitted SS block position in a serving cell may be carried other than by PBCH. PBCH may only carry the master system information, or the minimal required system information; other system information may be broadcasted in other channels, such as PDSCH in LTE.

Figure 5E:
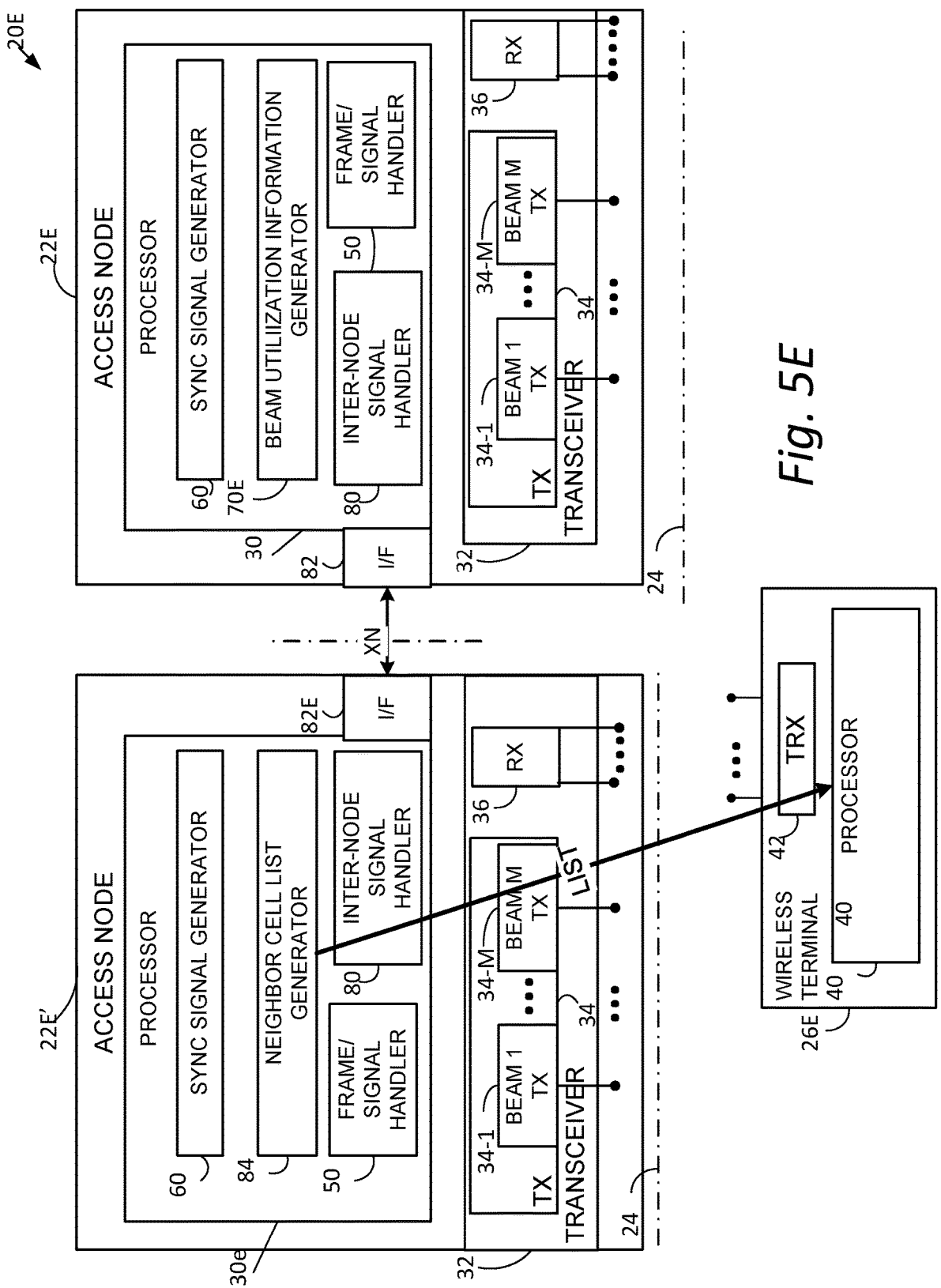

In an example embodiment and mode illustrated in FIG. 5E, the radio access node 22E generates an inter-node signal to send to another node, e.g., neighbor node 22E'. The inter-node signal comprises the beam utilization information as generated by beam utilization information generator 70E. The beam utilization information the beam utilization information specifies for which of the L integer number of nominal synchronization signal blocks of a synchronization signaling (SS) block burst set the node actually transmits synchronization signal blocks.

FIG. 5E shows that radio access node 22E comprises inter-node signal handler 80 as well as inter-node signaling interface (I/F) 82. In a new radio communications system, the inter-node signaling interface (I/F) 82 connects over a XN interface, which is analogous to the X2 interface of LTE. The beam utilization information which is generated by beam utilization information generator 70E is provided to the inter-node signal handler 80, which in turn provides an appropriate signal (in which the beam utilization information may be an information element) to inter-node signaling interface (I/F) 82. The inter-node signaling interface (I/F) 82 then transmits the signal including the beam utilization information to radio access node 22E'.

In FIG. 5E the radio access node 22E' is the access node for the serving cell for wireless terminal 26E, while radio access node 22E is associated with a neighbor cell. The radio access node 22E' comprises inter-node signaling interface (I/F) 82', which serves as interface circuitry to receive the inter-node signal from radio access node 22E. As already explained, the inter-node signal received from radio access node 22E comprises beam utilization information which specifies for which of the L integer number of synchronization signal blocks of a synchronization signaling (SS) block burst set the radio access node 22E actually transmits synchronization signal blocks.

Figure 11:
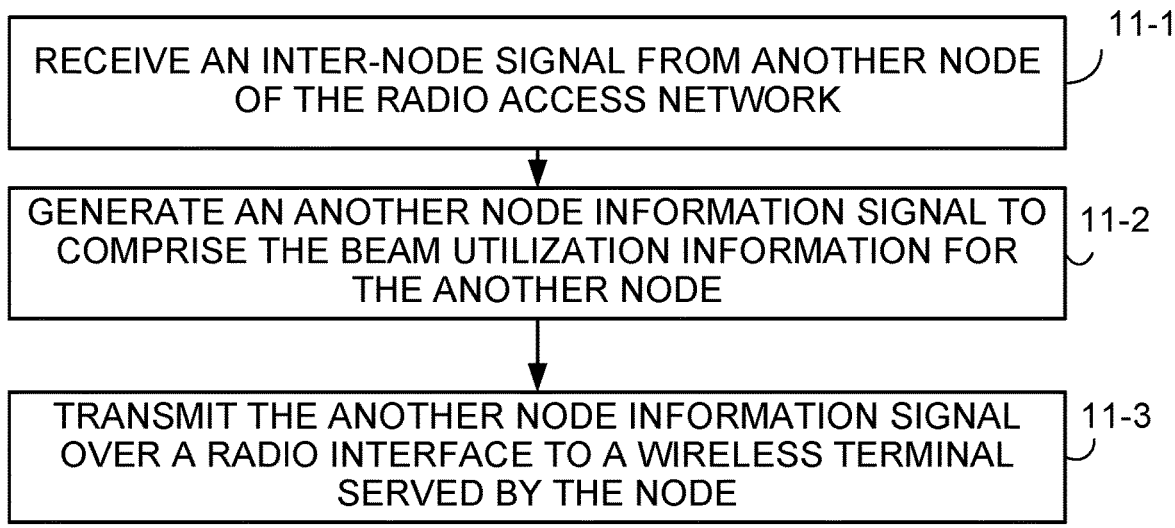
FIG. 11 is a flowchart showing example, non-limiting, representative acts or steps performed by a serving radio access node of the example embodiment and mode of FIG. 5E which receives an inter-node signal comprising beam utilization information from another node of the radio access network.

FIG. 11 shows example, representative, non-limiting acts or steps performed by radio access node 22E'. Act 11-1 comprises the radio access node 22E', and inter-node signaling interface (I/F) 82' in particular, receiving an inter-node signal from another node of the radio access network. As indicated above, the inter-node signal comprises beam utilization information which specifies for which of the L integer number of synchronization signal blocks of a synchronization signaling (SS) block burst set the another node actually transmits synchronization signal blocks. After receipt of the inter-node signal, as act 11-2 the node processor 30E' of radio access node 22E' generates another node information signal, e.g., a neighbor node information signal, which comprises the beam utilization information received from or for the another node, e.g., from or for radio access node 22E. As act 11-3 the node transmitter circuitry 34 of radio access node 22E' then transmits the another node information signal, e.g., the neighbor node information signal which carries the beam utilization information for the neighbor node, over a radio interface 24 to a wireless terminal wireless terminal 26E served by the radio access node 22E'.

Not only may the radio access node 22E' receive inter-node signaling from one radio access node 22E, but such inter-node signaling which includes beam utilization information may be received from several other nodes. In such typical case, the processor circuitry is further configured to generate the another node information signal to include the beam utilization information for the plural other nodes. Accordingly, in serving to generate node information list the node processor 30 may serve as a neighbor cell list generator 84, as so labeled in FIG. 5E. The neighbor cell list generator 84 of radio access node 22E' may generate both an intra-frequency neighbor cell list as shown in Table 2, or an inter-frequency neighbor cell list as shown in Table 3. Both such lists include the beam utilization information for one or more other (e.g., neighbor) nodes. The list(s) generated by neighbor cell list generator 84 may be transmitted to wireless terminal 26E either by dedicated or broadcast signaling. Alternatively, the list generated by neighbor cell list generator 84, may be transmitted to the wireless terminal 26E upon receipt of an on-demand request by wireless terminal 26E for the list, e.g., for the beam utilization information for a neighbor cell or node.

Table 3 is a Mapping between actual SS block TX pattern index and intra-frequency neighboring cell list; Table 4 is a Mapping between actual SS block TX pattern index and inter-frequency neighboring cell list.

TABLE 3

| intraFreqNeighCellList | Actual Transmitted Pattern Index |
| --- | --- |
| Cell ID 0 | 2 |
| Cell ID 1 | 5 |
| Cell ID 2 | 3 |
| Cell ID 3 | 3 |
| Cell ID 4 | 1 |
| Cell ID 5 | 1 |
| Cell ID 6 | 2 |
| Cell ID 7 | 0 |

TABLE 4

| interFreqNeighCellList | Actual Transmitted Pattern Index |
| --- | --- |
| Cell ID 0 | 3 |
| Cell ID 1 | 4 |
| Cell ID 2 | 2 |
| Cell ID 3 | 2 |
| Cell ID 4 | 0 |
| Cell ID 5 | 1 |
| Cell ID 6 | 5 |
| Cell ID 7 | 0 |

In Table 2 and Table 3, it is assumed that 8 intra-frequency/inter-frequency neighboring cells are configured with their IDs to the wireless terminal 26E for intra-frequency/inter-frequency neighboring cell measurement. "8" is just one example, it could be any integer number indicating the maximum supportable number of intra-frequency/inter-frequency neighboring cells.

The information in Table 2 and Table 3 should be signaled to wireless terminal 26E in two different signalings: one is for intra-frequency measurement purpose, e.g., similar as SIB 4 in LTE system; the other is for inter-frequency measurement purpose, e.g., similar as SIB 5 in LTE system. For example, the node may transmit second information (e.g., intraFreqNeighCellList) including a physical cell ID and the actual transmitted pattern index.

Also, the node may transmit third information (e.g., interFreqNeighCellList) including a physical cell ID and the actual transmitted pattern index. And, the second information and the third information may be included in different system informant blocks.

In addition, this information can also be signaled to wireless terminal 26E in dedicated RRC signaling. If the wireless terminal 26E receives both broadcast signaling and dedicated signaling about it, and these two signaling have different content, the information specified in dedicated signaling should take effect.

Furthermore, if the information is signaled to the wireless terminal 26E in broadcast signaling, besides the way the network configures it, it can be sent to wireless terminal 26E upon request by wireless terminal 26E, in the format of on-demand system information, if the wireless terminal 26E wants to perform neighboring cell measurement.

Figure 12:
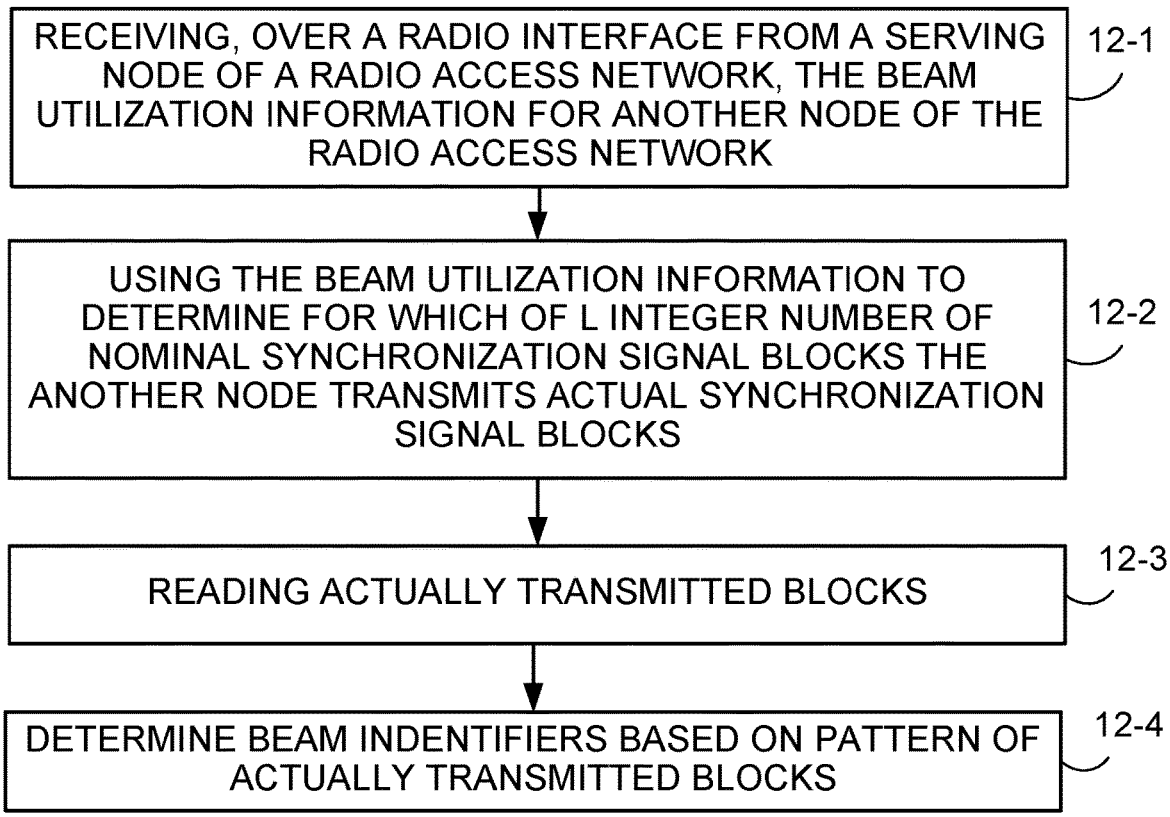
FIG. 12 is a flowchart showing example, non-limiting, representative acts or steps performed by a wireless terminal of the example embodiment and mode of FIG. 5E which beam utilization information of another node from a serving node of the radio access network

FIG. 12 shows example, representative non-limiting acts or steps which may be performed by wireless terminal 26E of FIG. 5E. Act 12-1 comprises the wireless terminal 26E receiving, over a radio interface from a serving node of a radio access network, the beam utilization information for another node of the radio access network. As indicated above, such beam utilization information for the another node may be included in the another node information signal. Act 12-2 comprises the terminal processor 40E of wireless terminal 26E using the beam utilization information to determine for which of L integer number of nominal synchronization signal blocks the another node transmits actual synchronization signal blocks. Act 12-3 comprises the terminal processor 40 of wireless terminal 26E reading the actually transmitted blocks.

Thus, as a result of act 12-2, as act 12-3 the wireless terminal 26E, knowing the actually transmitted synchronization signal blocks, and thus knowing the actual transmission pattern as act 12-3, can read those actually transmitted blocks, i.e., synchronization signal blocks actually transmitted from the neighbor node 22E. Based on such knowledge of the actual transmission pattern, and receipt of synchronization signal blocks within a sliding detection time window (e.g., 20 milliseconds), as act 12-4 the wireless terminal 26E determines beam identifiers (e.g., beam indexes) corresponding to the received synchronization signal blocks in the order of synchronization signal block reception within the detection window. The sliding window is established to match the synchronization signaling (SS) block burst set periodicity. In the measurement sliding window the wireless terminal 26E captures the entire synchronization signal block. Therefore, the wireless terminal 26E can determine the beam identifiers without having to reach the PBCH which may be provided in the synchronization signal blocks.

Thus, as indicated above, when the UE receives the actual SS block transmission position information (i.e., the beam utilization information), the wireless terminal 26E knows the corresponding SS block index of each actual transmitted SS block. This is explained by way of example as follows: Assuming in one practical case for that given carrier frequency, the nominal SS block number (L) is 4, the wireless terminal 26E obtains the actual SS block transmission position as [1 0 1 0], which means there are actual SS block transmissions in the second and forth nominal SS block positions. As the SS burst set transmission has its periodicity, when the wireless terminal 26E starts a measurement procedure and captures a whole SS burst set, the wireless terminal 26E obviously knows which transmitted SS block belongs to which beam. But if the wireless terminal 26E captures part of SS burst set, e.g., capturing only one actual SS block transmission, the wireless terminal 26E knows that it is supposed to capture two SS block transmissions and misses one, and determines the captured SS block is belongs to the 4th beam.

The position(s) of the nominal SS block (s) (and/or the position(s) of the SS burst(s), and/or the position(s) of the SS burst set (s)) may be determined based on the maximum number of the SS block(s) "L". Also, the position(s) of the actual SS block (s) (and/or the position(s) of the SS burst(s), and/or the position(s) of the SS burst set (s)) may be determined based on the maximum number of the SS block(s) "L". Namely, the wireless terminal may identify the position(s) of the nominal SS block(s) and/or the actual transmitted SS block(s) based on the maximum number of the SS block(s) "L".

Namely, a wireless terminal may receive information (e.g., the second information and/or the third information) including a list of physical cell identifiers (ID) and the actual transmitted SS block patterns. And, each of the actual transmitted SS block patterns may be used for indicating a position(s) of actual transmitted SS block(s) within the SS burst set in a cell associated by each of the physical cell identifiers. For example, for the initial cell selection, the position(s) of actual transmitted SS block(s) may be configured by using the PBCH. Also, for example, for the neighboring cell measurement, the information (e.g., the second information and/or the third information) including a list of physical cell identifiers (ID) and the actual transmitted SS block patterns may be transmitted by using the system information message. Here, the information (e.g., the second information and/or the third information) including a list of physical cell identifiers (ID) and the actual transmitted SS block patterns may be transmitted in the serving cell. Also, the information (e.g., the second information and/or the third information) including a list of physical cell identifiers (ID) and the actual transmitted SS block patterns may be transmitted only for the neighboring cell.

B.4 Identifying Utilized Beams: Using Other Signals

The neighboring cell measurements are related to reference signal measurements. Thus in another example embodiment and mode the SS block index information can also be carried by reference signal(s). For example, the reference signal patterns can be used to indicate the SS block index; or the reference signal can be CRC checked and scrambled with SS block index information through XOR operation, so the blind detection can help UE achieve SS block information.

Furthermore, in a new radio (NR) system, reference signals for beam/cell quality measurement include SSS and additional CSI-RS, and even a third synchronization signal (TSS). Any one or any combinations can be used to carry the SS block index; in the case of combination, it is pre-defined that which reference signal carries which part of SS block index number, e.g., assuming the actual SS block index is 4, which can be expressed as [0 1 0 0], so it can be pre-defined that SSS carries [0 1], and CSI-RS carries [0 0].

One purpose for informing a wireless terminal of the actual transmitted SS block is to let the wireless terminal know that some nominal SS blocks' positions which are not used by actual transmitted can be used for other data/signal transmission. This does not necessarily mean that these positions not used for actual SS block transmission are actually used for other information transmission. Accordingly, in an example embodiment and mode the radio access node may also transmit the actual NR-PDSCH (or other channel, e.g., NR-PDCCH, or other signals, such as reference signals) transmission pattern information within the synchronization signaling (SS) block burst set to the wireless terminal. Such pattern information may be in the format of a practical pattern; or in the format of a relative pattern. For example, assume that the actual SS block transmission pattern within a SS burst set is [1 0 1 0 0 0 1 0], so the positions of nominal SS block which are not used for SS block transmission are the 2nd, 4th, 5th, 6th, 8th ones. However, these positions are not necessarily used for NR-PDSCH transmission. But further assume that the 4th, 5th, 6th positions are indeed used for actual NR-PDSCH transmission. So the actual NR-PDSCH transmission pattern information within the synchronization signaling (SS) block burst set could be [0 0 0 1 1 1 0 0], in the format of practical pattern; or [0 1 1 1 0 0], in the format of relative pattern, because relative pattern means the time index on top of the indicated actual SS block transmission pattern. Such information can be broadcasted to the wireless terminal, or dedicated signaled to the wireless terminal, or signaled to the UE in the NR-PDCCH, e.g., NR common PDCCH.

Figure 13:
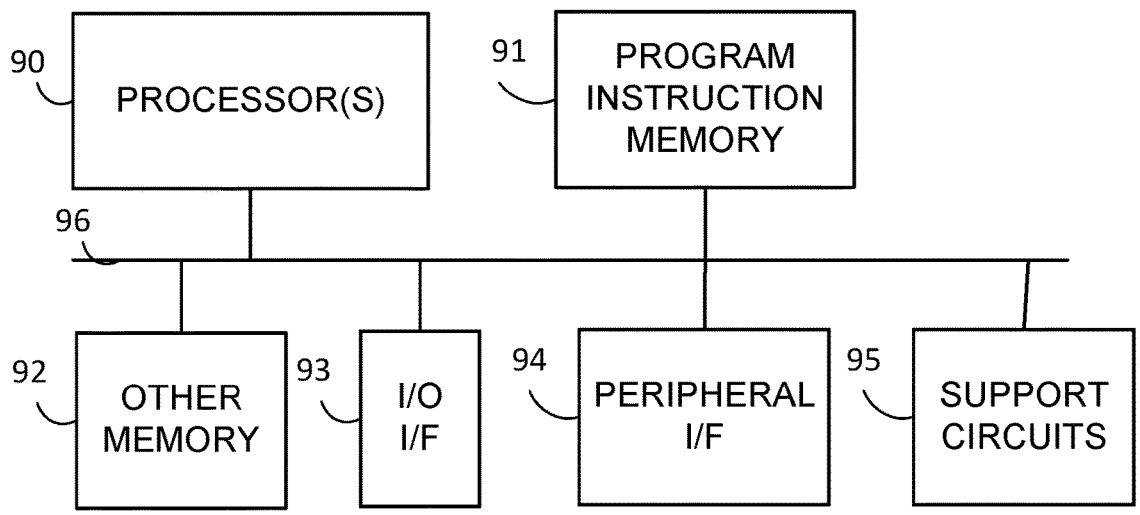
FIG. 13 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 13. FIG. 13 shows an example of such electronic machinery or circuitry, whether node or terminal, as comprising one or more processor(s) circuits 90, program instruction memory 91; other memory 92 (e.g., RAM, cache, etc.); input/output interfaces 93; peripheral interfaces 94; support circuits 95; and busses 96 for communication between the aforementioned units.

The program instruction memory 91 may comprise coded instructions which, when executed by the processor(s), perform acts including but not limited to those described herein. Thus is understood that each of node processor 30 and terminal processor 40, for example, comprise memory in which non-transient instructions are stored for execution.

The memory, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 95 may be coupled to the processors 90 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources. For example, the technology disclosed herein overcomes inefficiencies in telecommunications operations by providing to a wireless terminal advance knowledge for which of the L integer number of synchronization signal blocks of a synchronization signaling (SS) block burst set the node actually transmits synchronization signal blocks. Such foreknowledge of actual synchronization signal block positions expedites not only the processing of the synchronization signaling (SS) block burst set, but also the measurements that are intensively performed on a beam-by-beam basis. Moreover, by providing techniques for identifying the synchronization signal block indices and/or beam indices, the wireless terminal can correlate energy measurements on references signals to the actual beams to which the measurements relate, and thereby provide improved assessment of signal strength for making determinations of cell selection, cell re-selection, and/or handover and the like.

NR system neighboring cell measurements. In order to (A) signal the actual positions of SS block to UE, and (B) obtain SS block index information for neighboring cell measurement, the technology disclosed herein advantageously includes:

Consideration of tradeoff between signaling overhead and wireless terminal complexity, having several designs with different preference on the tradeoff For no PBCH information decoding during neighboring cell measurement, the PBCH implicitly carries the index information. The wireless terminal does not have to decode the PBCH so as to obtain the information. Rather, once the wireless terminal detects PBCH, the wireless terminal can obtain the index information. Therefore, the technology disclosed herein provides a new index information obtaining method through PBCH detection, and also adds an extra PBCH detection step during the neighboring cell measurement, which is different from all existing neighboring cell measurement procedures.

Combines the designs solving sections (A) and (B) to have a unified design so as to minimize system complexity.

The technology disclosed herein includes but is not limited to the following example embodiments and modes.

Example Embodiment 1

A node of a radio access network comprising:
processor circuitry configured to generate a synchronization signaling (SS) block burst set periodically transmitted by the node and beam utilization information; and,
transmitter circuitry configured to transmit the synchronization signaling (SS) block burst set and the beam utilization information over a radio interface.

Example Embodiment 2

The node of Example embodiment 1, wherein the processor circuitry is configured to generate the beam utilization information to be transmitted separately over the radio interface from the synchronization signaling (SS) block burst set. 1.

Example Embodiment 3

The node of Example embodiment 1, wherein the processor circuitry is configured to generate the beam utilization information to indicate actual content of the synchronization signaling (SS) block burst set.

Example Embodiment 4

The node of Example embodiment 1, wherein the synchronization signaling (SS) block burst set comprises L integer number of nominal synchronization signal blocks, and wherein the beam utilization information specifies for which of the L integer number of synchronization signal blocks of a synchronization signaling (SS) block burst set the node actually transmits synchronization signal blocks.

Example Embodiment 5

The node of Example embodiment 4, wherein the processor circuitry is configured to generate the beam utilization information as a bitmap which specifies for which of the L integer number of synchronization signal blocks of a synchronization signaling (SS) block burst set the node actually transmits synchronization signal blocks.

Example Embodiment 6

The node of Example embodiment 5, wherein the processor circuitry is configured to generate the beam utilization information as a bitmap as a sequence or channel of bits.

Example Embodiment 7

The node of Example embodiment 5, wherein the processor circuitry is configured to generate the beam utilization information as downlink information which is scrambled or encoded by the bitmap.

Example Embodiment 8

The node of Example embodiment 7, wherein the downlink information which is scrambled or encoded by the bitmap comprises at least one of information bits, parity bits, cyclical redundancy check bits, or a combination thereof.

Example Embodiment 9

The node of Example embodiment 4, wherein the processor circuitry is configured to generate the beam utilization information as one index of plural possible index values, each of the plural possible index values corresponding to a unique one of plural patterns of actual synchronization signal block transmission.

Example Embodiment 10

The node of Example embodiment 9, wherein a relationship of each of the plural possible index values to its corresponding one of plural patterns of actual synchronization signal block transmission is signaled to a wireless terminal.

Example Embodiment 11

The node of Example embodiment 9, wherein one index is transmitted in as a channel bit over the radio interface.

Example Embodiment 12

The node of Example embodiment 1, wherein the transmitter circuitry is configured to transmit synchronization signaling (SS) block burst sets on plural carrier bands; and wherein the processor circuitry is configured to generate the beam utilization information according to a same description convention for each of the plural carrier bands.

Example Embodiment 13

The node of Example embodiment 1, wherein the transmitter circuitry is configured to transmit on plural carrier bands; and wherein the processor circuitry is configured to generate the beam utilization information according to a first convention for a first carrier band and to generate the beam utilization information according to a second description convention for a second carrier band.

Example Embodiment 14

The node of Example embodiment 1, wherein the processor circuitry is configured to generate the beam utilization information for a same carrier frequency band according to plural description conventions.

Example Embodiment 15

The node of Example embodiment 14, wherein the transmitter circuitry is configured to generate the beam utilization information using a first description convention for a first subset of frequencies of the same carrier frequency band and using a second description convention for a second subset of frequencies of the same carrier frequency band.

Example Embodiment 16

The node of Example embodiment 14, wherein the processor circuitry is configured to generate the beam utilization information using a first description convention for a first time duration of the same carrier frequency band and using a second description convention for a second time duration of the same carrier frequency band.

Example Embodiment 17

The node of Example embodiment 16, wherein the first time duration occurs when the actual number of transmitted synchronization signal blocks of the synchronization signaling (SS) block set is a first number and wherein the second time duration occurs when the actual number of transmitted synchronization signal blocks of the synchronization signaling (SS) block burst set is a second number which is different from the first number.

Example Embodiment 18

The node of Example embodiment 1, wherein the transmitter circuitry generates plural beams, and wherein the processor circuitry is configured to generate the beam utilization information to indicate beam identification information for one or more plural beams associated with the synchronization signal blocks of a synchronization signaling (SS) block burst set.

Example Embodiment 19

The node of Example embodiment 18, wherein the processor circuitry is configured to generate the beam utilization information to comprise a synchronization signal block index carried in a physical broadcast channel of the synchronization signal blocks transmitted from the node.

Example Embodiment 20

The node of Example embodiment 18, wherein for a particular beam the processor circuitry is configured to generate the beam utilization information as symbol level scrambling of system information transmitted from the node by the particular beam.

Example Embodiment 21

The node of Example embodiment 20, wherein the processor circuitry is configured to symbol level scramble the system information transmitted using a SS block index corresponding to the particular beam.

Example Embodiment 22

The node of Example embodiment 20, wherein the processor circuitry is configured to symbol level scramble a predetermined number of symbols of the system information.

Example Embodiment 23

The node of Example embodiment 1, wherein the transmitter circuitry generates plural beams, and wherein the processor circuitry generates an inter-node signal for transmission to a neighboring node of the radio access network, wherein the inter-node signal comprises the beam utilization information, and wherein the beam utilization information the beam utilization information specifies for which of the L integer number of nominal synchronization signal blocks of a synchronization signaling (SS) block burst set the node actually transmits synchronization signal blocks.

Example Embodiment 24

The node of Example embodiment 18, wherein the processor circuitry is configured to generate the beam utilization information as a pattern of reference signals carried in a synchronization signaling (SS) block burst set transmitted from the node, positions of the reference signals in the pattern corresponding to synchronization signal block indices.

Example Embodiment 25

The node of Example embodiment 18, wherein the processor circuitry is configured to generate the beam utilization information by scrambling reference signals carried in a synchronization signaling (SS) block burst set with corresponding synchronization signal block indices.

Example Embodiment 26

The node of Example embodiment 18, wherein the processor circuitry is configured to generate the beam utilization information by scrambling information carried in a synchronization signaling (SS) block burst set with a synchronization signal block index.

Example Embodiment 27

The node of Example embodiment 26, wherein the scrambled information carried in a synchronization signaling (SS) block burst set comprises one or more of: a reference signal; a secondary synchronization sequence; a tertiary synchronization sequence.

Example Embodiment 28

A method in a node of a radio access network comprising:
generating beam utilization information;
transmitting the beam utilization information over a radio interface;
generating a synchronization signaling (SS) block burst set to be transmitted by the node; and
periodically transmitting the synchronization signaling (SS) block burst set over the radio interface.

Example Embodiment 29

A node of a radio access network, the node comprising:
interface circuitry configured to receive an inter-node signal from another node of the radio access network, the inter-node signal comprising beam utilization information which specifies for which of the L integer number of synchronization signal blocks of a synchronization signaling (SS) block burst set the another node actually transmits synchronization signal blocks;
processor circuitry configured to generate an another node information signal to comprise the beam utilization information for the another node;
transmitter circuitry configured to transmit the another node information signal over a radio interface to a wireless terminal served by the node.

Example Embodiment 30

The node of Example embodiment 29, wherein the receiver circuitry is configured to receive inter-node signals from plural other nodes, and wherein the processor circuitry is further configured to generate the another node information signal to include the beam utilization information for the plural other nodes.

Example Embodiment 31

The node of Example embodiment 30, wherein from processor circuitry is further configured to generate the another node information signal as an intra-frequency neighbor cell list.

Example Embodiment 32

The node of Example embodiment 30, wherein from processor circuitry is further configured to generate the another node information signal as an inter-frequency neighbor cell list.

Example Embodiment 33

The node of Example embodiment 29, wherein from processor circuitry is further configured to generate the another node information signal for transmission as dedicated signaling or broadcast signaling.

Example Embodiment 34

The node of Example embodiment 29, wherein the processor circuitry is further configured to generate the another node information signal for transmission to a wireless terminal upon demand request by the wireless terminal.

Example Embodiment 35

A wireless terminal comprising:
receiver circuitry for receiving a synchronization signaling (SS) block burst set and beam utilization information over a radio interface;
processor circuitry configured to use the beam utilization information to decode the synchronization signaling (SS) block burst set.

Example Embodiment 36

The node of Example embodiment 35, wherein the receiver circuitry is configured to separately receive the synchronization signaling (SS) block burst set and the beam utilization information over the radio interface.

Example Embodiment 37

The wireless terminal of Example embodiment 35, wherein the processor circuitry is determine actual content of the synchronization signaling (SS) block burst set from the beam utilization information.

Example Embodiment 38

The wireless terminal of Example embodiment 35, wherein the synchronization signaling (SS) block burst set comprises L integer number of nominal synchronization signal blocks, and wherein the beam utilization information specifies for which of the L integer number of synchronization signal blocks of a synchronization signaling (SS) block burst set the node actually transmits synchronization signal blocks.

Example Embodiment 39

The wireless terminal of Example embodiment 38, wherein the processor circuitry is configured to decode the beam utilization information as a bitmap which specifies for which of the L integer number of synchronization signal blocks of a synchronization signaling (SS) block burst set the node actually transmits synchronization signal blocks.

Example Embodiment 40

The wireless terminal of Example embodiment 39, wherein the processor circuitry is configured to decode the beam utilization information as a bitmap as a sequence or channel of bits.

Example Embodiment 41

The wireless terminal of Example embodiment 39, wherein the processor circuitry is configured to decode the beam utilization information as downlink information which is scrambled or encoded by the bitmap.

Example Embodiment 42

The wireless terminal of Example embodiment 41, wherein the downlink information which is scrambled or encoded by the bitmap comprises at least one of information bits, parity bits, cyclical redundancy check bits, or a combination thereof.

Example Embodiment 43

The wireless terminal of Example embodiment 38, wherein the processor circuitry is configured to decode the beam utilization information as one index of plural possible index values, each of the plural possible index values corresponding to a unique one of plural patterns of actual synchronization signal block transmission.

Example Embodiment 44

The wireless terminal of Example embodiment 43, wherein the receiver circuitry is further configured to receive a signal which describes a relationship of each of the plural possible index values to its corresponding one of plural patterns of actual synchronization signal block transmission.

Example Embodiment 45

The wireless terminal of Example embodiment 43, wherein one index is received in as a channel bit over the radio interface.

Example Embodiment 46

The wireless terminal of Example embodiment 35, wherein the receiver circuitry is configured to receive synchronization signaling (SS) block burst sets on plural carrier bands; and wherein the processor circuitry is configured to decode the beam utilization information according to a same description convention for each of the plural carrier bands.

Example Embodiment 47

The wireless terminal of Example embodiment 35, wherein the receiver circuitry is configured to receive on plural carrier bands; and wherein the processor circuitry is configured to decode the beam utilization information according to a first convention for a first carrier band and to generate the beam utilization information according to a second description convention for a second carrier band.

Example Embodiment 48

The wireless terminal of Example embodiment 35, wherein the processor circuitry is configured to decode the beam utilization information for a same carrier frequency band according to plural description conventions.

Example Embodiment 49

The wireless terminal of Example embodiment 48, wherein the processor circuitry is configured to decode the beam utilization information using a first description convention for a first subset of frequencies of the same carrier frequency band and using a second description convention for a second subset of frequencies of the same carrier frequency band.

Example Embodiment 50

The wireless terminal of Example embodiment 48, wherein the processor circuitry is configured to decode the beam utilization information using a first description convention for a first time duration of the same carrier frequency band and using a second description convention for a second time duration of the same carrier frequency band.

Example Embodiment 51

The wireless terminal of Example embodiment 50, wherein the first time duration occurs when the actual number of transmitted synchronization signal blocks of the synchronization signaling (SS) block burst set is a first number and wherein the second time duration occurs when the actual number of transmitted synchronization signal blocks of the synchronization signaling (SS) block burst set is a second number which is different from the first number.

Example Embodiment 52

The wireless terminal of Example embodiment 35, wherein the receiver circuitry receives plural beams, and wherein the processor circuitry is configured to decode the beam utilization information to determine for which of the plural beams the processor circuitry generates a synchronization signaling (SS) block.

Example Embodiment 53

The wireless terminal of Example embodiment 52, wherein the processor circuitry is configured to decode the beam utilization information as a synchronization signal block index carried in a physical broadcast channel of the synchronization signal blocks transmitted from the node.

Example Embodiment 54

The wireless terminal of Example embodiment 52, wherein for a particular beam the processor circuitry is configured to decode the beam utilization information as symbol level de-scrambling of system information transmitted from the node by the particular beam.

Example Embodiment 55

The wireless terminal of Example embodiment 54, wherein the processor circuitry is configured to symbol level de-scramble the system information transmitted using a SS block index corresponding to the particular beam.

Example Embodiment 56

The wireless terminal of Example embodiment 54, wherein the processor circuitry is configured to symbol level de-scramble a predetermined number of symbols of the system information.

Example Embodiment 57

The wireless terminal of Example embodiment 52, wherein the processor circuitry is configured to decode the beam utilization information as a pattern of reference signals carried in a synchronization signaling (SS) block burst set, positions of the reference signals in the pattern corresponding to synchronization signal block indices.

Example Embodiment 58

The wireless terminal of Example embodiment 52, wherein the processor circuitry is configured to decode the beam utilization information by de-scrambling reference signals carried in a synchronization signaling (SS) block burst set with corresponding synchronization signal block indices.

Example Embodiment 59

The wireless terminal of Example embodiment 52, wherein the processor circuitry is configured to decode the beam utilization information by de-scrambling information carried in a synchronization signaling (SS) block burst set with a synchronization signal block index.

Example Embodiment 60

The wireless terminal of Example embodiment 52, wherein the scrambled information carried in a synchronization signaling (SS) block burst set comprises one or more of: a reference signal; a secondary synchronization sequence; a tertiary synchronization sequence.

Example Embodiment 61

A method in a wireless terminal which communicates with an access node of a radio access network over a radio interface comprising:
receiving beam utilization information from the access node;
periodically receiving a synchronization signaling (SS) block burst set transmitted by the access node; and
using the beam utilization information to decode the synchronization signaling (SS) block burst set.

Example Embodiment 62

A wireless terminal comprising:
receiver circuitry for receiving, over a radio interface from a serving node of a radio access network, beam utilization information for another node of the radio access network;
processor circuitry configured to use the beam utilization information to determine for which of L integer number of nominal synchronization signal blocks the another node transmits actual synchronization signal blocks.

Example Embodiment 63

The wireless terminal of Example embodiment 29, wherein the receiver circuitry is configured to receive, over the radio interface from the serving node, beam utilization information for plural other nodes of the radio access network.

Example Embodiment 64

The wireless terminal of Example embodiment 63, wherein the processor circuitry is further configured to decode the another node information signal as an intra-frequency neighbor cell list.

Example Embodiment 65

The wireless terminal of clam 63, wherein from processor circuitry is further configured to decode the another node information signal as an inter-frequency neighbor cell list.

Example Embodiment 66

The wireless terminal of Example embodiment 63, wherein from receiver circuitry is further configured to receive the another node information signal for transmission as dedicated signaling or broadcast signaling.

Example Embodiment 67

The wireless terminal of 63, wherein the processor circuitry is further configured to make an on-demand request for the another node information signal.

Example Embodiment 68

A user equipment comprising:
receiving circuitry configured to receive bit map information indicating time domain positions, within a measurement window, of synchronization signal block(s) (SSB(s)) used for an intra and/or an inter-frequency measurement,
the SSB(s) comprising at least a primary synchronization signal (PPS), a secondary synchronization signal (SSS), and a physical broadcast channel (PBCH),
wherein the bitmap information comprises a bit string, and different lengths of the bit string are defined for different frequency bands.

Example Embodiment 69

The user equipment of Example embodiment 68, wherein the processor circuitry is configured to make the frequency measurement on a basis of the synchronization signal block (SSB).

Example Embodiment 70

A method in a user equipment comprising:
receiving bit map information indicating time domain positions, within a measurement window, of synchronization signal block(s) (SSB(s)) used for an intra and/or an inter-frequency measurement,
the SSB(s) comprising at least a primary synchronization signal (PPS), a secondary synchronization signal (SSS), and a physical broadcast channel (PBCH),
wherein the bitmap information comprises a bit string, and different lengths of the bit string are defined for different frequency bands.

Example Embodiment 71

The method of Example embodiment 70, further comprising using the processor circuitry to make the frequency measurement on a basis of the synchronization signal block (SSB).

Example Embodiment 72

An access node of a radio access network, comprising:
transmitting circuitry configured to transit, over a radio interface to at least one user equipment, bit map information indicating time domain positions, within a measurement window, of synchronization signal block(s) (SSB(s)) used for an intra and/or an inter-frequency measurement,
the SSB(s) comprising at least a primary synchronization signal (PPS), a secondary synchronization signal (SSS), and a physical broadcast channel (PBCH),
wherein the bitmap information comprises a bit string, and different lengths of the bit string are defined for different frequency bands.

Example Embodiment 73

A method in an access node of a radio access network, comprising:
generating bit map information indicating time domain positions, within a measurement window, of synchronization signal block(s) (SSB(s)) used for an intra and/or an inter-frequency measurement,
the SSB(s) comprising at least a primary synchronization signal (PPS), a secondary synchronization signal (SSS), and a physical broadcast channel (PBCH),
wherein the bitmap information comprises a bit string, and different lengths of the bit string are defined for different frequency bands; and
transmitting the bitmap information over a radio interface to at least one user equipment.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment comprising:
receiving circuitry configured to receive, from a base station apparatus, bitmap information indicating at least one time domain position of at least one synchronization signal block (SSB) used for at least one of an intra-frequency and an inter-frequency measurement within a measurement window; and
processing circuitry configured to perform, based on the at least one SSB, the at least one of an intra-frequency and an inter-frequency measurement, wherein:
the at least one SSB comprises at least a primary synchronization signal (PSS), a secondary synchronization signal (SSS), and a physical broadcast channel (PBCH), and
the bitmap information is one of a plurality of bit sequences, a length of each of the plurality of bit sequences is different from each other, the length of each of the plurality of bit sequences is defined for each of three different frequency ranges including a first frequency range that is lower than 3 gigahertz (GHz), a second frequency range that is equal to or greater than 3 GHz and less than or equal to 6 GHz, and a third frequency range that is higher than 6 GHz, the length being less than 4 bits for the first frequency range, the length equal to 8 bits for the second frequency range, the length equal to 64 bits for the third frequency range.

2. A method of a user equipment comprising:
receiving, from a base station apparatus, bitmap information indicating at least one time domain position of at least one synchronization signal block (SSB) used for at least one of an intra-frequency and an inter-frequency measurement within a measurement window; and
performing, based on at least one the SSB, at least one of the intra-frequency and the inter-frequency measurement, wherein:
the at least one SSB comprises at least a primary synchronization signal (PSS), a secondary synchronization signal (SSS), and a physical broadcast channel (PBCH), and
the bitmap information is one of a plurality of bit sequences, a length of each of the plurality of bit sequences is different from each other, the length of each of the plurality of bit sequences is defined for each of three different frequency ranges including a first frequency range that is lower than 3 gigahertz (GHz), a second frequency range that is equal to or greater than 3 GHz and less than or equal to 6 GHz, and a third frequency range that is higher than 6 GHz, the length being less than 4 bits for the first frequency range, the length equal to 8 bits for the second frequency range, the length equal to 64 bits for the third frequency range.

3. A base station apparatus, comprising:
generating circuitry configured to generate bitmap information indicating at least one time domain position of at least one synchronization signal block (SSB) used for at least one of an intra-frequency and an inter-frequency measurement within a measurement window; and
transmitting circuitry configured to transmit, to a user equipment, the bitmap information, wherein:
the at least one SSB comprises at least a primary synchronization signal (PSS), a secondary synchronization signal (SSS), and a physical broadcast channel (PBCH), and
the bitmap information is one of a plurality of bit sequences, a length of each of the plurality of bit sequences is different from each other, the length of each of the plurality of bit sequences is defined for each of three different frequency ranges including a first frequency range that is lower than 3 gigahertz (GHz), a second frequency range that is equal to or greater than 3 GHz and less than or equal to 6 GHz, and a third frequency range that is higher than 6 GHz, the length being less than 4 bits for the first frequency range, the length equal to 8 bits for the second frequency range, the length equal to 64 bits for the third frequency range.

4. A method of a base station apparatus, comprising:
generating bitmap information indicating at least one time domain position of at least one synchronization signal block (SSB) used for at least one of an intra-frequency and an inter-frequency measurement within a measurement window, and
transmitting, to a user equipment, the bitmap information, wherein:
the at least one SSB comprises at least a primary synchronization signal (PSS), a secondary synchronization signal (SSS), and a physical broadcast channel (PBCH), and
the bitmap information is one of a plurality of bit sequences, a length of each of the plurality of bit sequences is different from each other, the length of each of the plurality of bit sequences is defined for each of three different frequency ranges including a first frequency range that is lower than 3 gigahertz (GHz), a second frequency range that is equal to or greater than 3 GHz and less than or equal to 6 GHz, and a third frequency range that is higher than 6 GHz, the length being less than 4 bits for the first frequency range, the length equal to 8 bits for the second frequency range, the length equal to 64 bits for the third frequency range.

* * * * *